(12) United States Patent  (10) Patent No.: US 8,397,570 B2
Verjus et al.  (45) Date of Patent: Mar. 19, 2013

(54) MULTI-AXIAL LINEAR AND ROTATIONAL DISPLACEMENT SENSOR

(75) Inventors: Fabrice Verjus, Creully (FR); Archit Giridhar, Singapore (SG)

(73) Assignee: NXP B.V., Eindhoven (NL)

( * ) Notice: Subject to any disclaimer, the term of this patent is extended or adjusted under 35 U.S.C. 154(b) by 352 days.

(21) Appl. No.: 12/669,539

(22) PCT Filed: Jul. 15, 2008

(86) PCT No.: PCT/IB2008/052839
§ 371 (c)(1),
(2), (4) Date: Jun. 24, 2010

(87) PCT Pub. No.: WO2009/013666
PCT Pub. Date: Jan. 29, 2009

(65) Prior Publication Data
US 2010/0257933 A1  Oct. 14, 2010

(30) Foreign Application Priority Data
Jul. 24, 2007 (EP) .................................... 07112984

(51) Int. Cl.
*G01P 15/125* (2006.01)
*G01P 15/08* (2006.01)
(52) U.S. Cl. ....................................... 73/510; 73/514.32
(58) Field of Classification Search ............ 73/510, 73/511, 514.32, 514.36, 514.38, 514.29
See application file for complete search history.

(56) References Cited

U.S. PATENT DOCUMENTS
4,839,838 A  6/1989 LaBiche et al.
5,723,790 A * 3/1998 Andersson ................. 73/514.36
6,122,965 A * 9/2000 Seidel et al. ............... 73/514.36
6,158,280 A * 12/2000 Nonomura et al. ......... 73/504.04
6,201,284 B1 * 3/2001 Hirata et al. ................... 257/415
6,484,577 B1 * 11/2002 Bennett ....................... 73/514.26
(Continued)

FOREIGN PATENT DOCUMENTS
EP  1688705 A2  8/2006
FR  2868843 A  10/2005
(Continued)

OTHER PUBLICATIONS

Lemkin, Mark, et al; "A Three-Axis Micromachined Accelerometer With a CMOS Position-Sense Interface and Digital Offset-Trim Electronics"; IEEE Journal of Solid-State Circuits; vol. 34, No. 4, Apr. 1999; p. 457-468.

(Continued)

*Primary Examiner* — Helen C. Kwok
(74) *Attorney, Agent, or Firm* — Kramer & Amado P.C.

(57) ABSTRACT

A MEMS multiaxial inertial sensor of angular and linear displacements, velocities, or accelerations has four comb drive capacitive sensing elements integrated on a planar substrate, each sensing element having an output responsive to displacement along a Z axis, and responsive to a displacement along X or Y axes. The sensing elements are located at different parts of the substrate on both sides of the X axis and the Y axis, the outputs being suitable for subsequently deriving linear and angular displacements about any of the X, Y or Z axes. Linear or angular movement is determined from combinations of the sensor signals.

14 Claims, 23 Drawing Sheets

U.S. PATENT DOCUMENTS

| | | | |
|---|---|---|---|
| 6,785,117 B2 * | 8/2004 | Sakai et al. | 361/280 |
| 6,829,937 B2 * | 12/2004 | Mahon | 73/514.29 |
| 6,981,416 B2 * | 1/2006 | Chen et al. | 73/510 |
| 7,210,351 B2 * | 5/2007 | Lo et al. | 73/514.32 |
| 7,398,683 B2 * | 7/2008 | Lehtonen | 73/514.32 |
| 7,934,423 B2 * | 5/2011 | Nasiri et al. | 73/514.02 |
| 8,047,075 B2 * | 11/2011 | Nasiri et al. | 73/514.32 |
| 2003/0210511 A1 | 11/2003 | Sakai et al. | |
| 2005/0217372 A1 | 10/2005 | Ao | |
| 2007/0119252 A1 | 5/2007 | Adams et al. | |
| 2012/0085169 A1 * | 4/2012 | Walmsley | 73/514.32 |

FOREIGN PATENT DOCUMENTS

| | | |
|---|---|---|
| JP | 11311521 A | 11/1999 |
| WO | 96/06328 A1 | 2/1996 |

OTHER PUBLICATIONS

Matsumoto, Y., et al; "Three-Axis SOI Capacitive Acceleratormeter With PLL C-V Converter"; Sensor and Actuators 75, 1999, pp. 77-85; Elsevier.

Plaza, J. A., et al; "New Bulk Accelerometer for Triaxial Detection"; 1997 Intl Conference on Solid State Sensors and Actuators, Chicago, IL, US, Jun. 16-19, 1997; IEEE; pp. 1231-1232.

Xie, Huikai, et al; "Vertical Comb-Finger Capacitive Actuation and Sensing for CMOS-MEMS"; Sensors and Actuators A 95, 2002; pp. 212-221.

International Search Report in related PCT/IB2008/052839 mailed Jan. 16, 2009.

* cited by examiner

MULTI-AXIAL LINEAR AND ROTATIONAL DISPLACEMENT SENSOR

FIELD OF THE INVENTION

This invention relates to multi-axial sensors and to methods of manufacturing such sensors.

BACKGROUND OF THE INVENTION

MEMS based sensors have been evolving to combine a sensing element along with the inclusion of several integrated elements inside a "system-in-package" (SIP). Among these integrated elements in the SIP are MEMS devices, interface circuitry, and microprocessor circuitry. These all require specific care when being packaged with the sensing element. Known sensing elements can be based on mechanical, inductive, capacitive, piezoelectric, and piezo-resistive or other sensing techniques.

For sensing attitude, location, or motion, it is known to use accelerometers and gyroscopes. 2-Dimensional accelerometers are widely available as integrated devices and more recently, integrated devices to sense variation also in the third dimension have become available. But such devices have noticeably lower capabilities in calibration along this dimension. In most cases, the device is fabricated on the same substrate which carries the sensing element. Thus the final device is the outcome of two or more single silicon substrates. The interface and the signal processing circuitry are to be integrated as a system.

The sensing element mentioned above typically has a proof mass, which displaces itself elastically with respect to the force, applied on it. This is the basic concept behind accelerometer designs. The proof-mass displaces corresponding to the force which in turn depends on the acceleration. The position of the proof-mass is sensed by one of various known techniques. In the case of capacitive accelerometers, a change in capacitance is related to the displacement of the proof-mass. The capacitor can have one electrode attached to the proof mass and one fixed electrode. These electrodes can be arranged in an interdigitated comb structure. The properties of the proof mass and its elastic support define the range of detection of the sensing element. The concept behind a capacitive accelerometer is to sense the displacement with respect to the change in capacitance.

For sensing the Coriolis effect a solution has been proposed by a device named "Gyroscopes". This device features the sensing of displacement along the axis of rotation normal to the plane of the structure (proof-mass). Various techniques have been deployed for the sensing action of the displacement. But still the displacement along the three axes and the displacement along the axis of rotation are on different devices. Both the devices can be fabricated using the same technology. For high-end-sensing operation, the known devices are typically fabricated on more than one silicon wafer or by using SOI or relevant technology.

U.S. patent application Ser. No. 2005217372 shows a physical quantity sensor for detecting an angular speed and an acceleration three dimensionally. The sensor includes: a substrate; three angular speed sensors disposed on the substrate; and three acceleration sensors disposed on the substrate. The three angular speed sensors are capable of detecting three components of an angular speed around three axes, each two of which intersect perpendicularly. The three acceleration sensors are capable of detecting three components of an acceleration in another three axes, each two of which intersect perpendicularly. The three axes of the angular speed sensors intersect at one point, and the other three axes of the acceleration sensors intersect at another one point.

The above physical quantity sensor can detect both of the angular speed and the acceleration three dimensionally with high accuracy. Further, in the physical quantity sensor, three detection axes of the angular speed sensors intersect at one point so that the detection accuracy of the angular speed becomes higher. Further, three detection axes of the acceleration sensors intersect at one point so that the detection accuracy of the acceleration becomes higher.

Patent application JP11311521A shows a multiaxial inertia quantity sensor which can be formed integrally by using micromachining technology and can detect angular velocity and linear acceleration in multiple axes. It has comb form intermeshing electrodes at the perimeter of a proof mass to provide rotational vibration to implement the gyroscopic angular sensor. Four electrodes are provided underneath the mass for detecting when the mass is tipped away from its rotation axis. These four electrodes act as capacitive sensors to detect a height of the mass above the substrate. Differences in the heights indicate tipping which indicates rotation according to gyroscopic action. Which two electrodes are higher than the others indicates which axis the rotation is occurring around. Changes in the height of all four sensors, indicates acceleration along the axis of rotation.

OBJECT AND SUMMARY OF THE INVENTION

An object of the invention is to provide improved multi-axial sensors and a methods of manufacturing such sensors. According to a first aspect, the invention provides a multiaxial inertial sensor of angular and linear displacements, the sensor having three or more sensing elements integrated on a planar substrate, each of the sensing elements having an output responsive to displacement along a Z-axis normal to a plane of the substrate, and responsive to a displacement parallel to the plane, the elements being located at different parts of the substrate on both sides of two perpendicular axes, an X-axis and a Y-axis, in the plane of the substrate, the sensing elements also being oriented in different directions in the plane, so that their outputs are also responsive to displacements along the X or Y axis, such that the outputs are sufficient to enable different combinations of them to be used to indicate linear displacements along any of the X, Y or Z axes and angular displacements about any of the X, Y or Z axes.

Particular features of the present invention are the way that the Z-axis signals are used in combinations, e.g. sensing elements able to detect in along the Z-axis as well as along the X and Y axes, and the sensing elements being on either side of the X and Y axes. This enables combining the outputs of the sensors in six (6) different ways. Circuitry for combining the outputs may be constructed as know to the skilled person and may be on or off-chip.

This new device according to the invention may use, for example, a plurality of sensing elements for determining both linear accelerations and angular velocity. This means it needs fewer sensing elements than if separate sensors were used. This can help make it more cost effective and/or smaller for example.

In other words, the new device senses displacement perpendicular to an axis of rotation. This means the plurality of sensing elements may be arranged to extend in different directions but in a single plane, which makes for easier integration on a substrate, with less restriction on the range of displacement, and thus more cost effective manufacture for a given range of displacement. This means the new device may particularly sense acceleration in multiple directions, not just one, along the axis of rotation. Again this means it needs fewer sensing elements to sense in multiple directions. This can help make it more cost effective and/or smaller for example.

A further advantage is that, by construction, the capacitance value of the sensor (i.e. between electrodes of the sensor) may be higher and better in relation to devices known so far. This is because the gap between the electrodes can be in the nanometer scale. Also a dedicated DC/DC converter (step-up converter) may be avoided.

The invention may be embodied with any additional feature added to those recited above while remaining within the scope of the main claim, and some such additional features are described below.

One such additional feature is the sensing elements being MEMs elements.

Another such additional feature is the mass comprising separate masses for each sensing element. Compared to having a single mass, this can increase sensitivity of sensing of displacements in different directions, for a given size of mass.

Another such feature is the separate masses being distributed over a movable electrode of the sensing element. Compared to masses lumped separately from the electrodes, this may help enable the size of the device to be reduced, and reduce the number of parts, thus facilitating integration and helping reduce manufacturing costs.

Another such feature is circuitry for combining the outputs to derive the displacements. This may be more cost effective if integrated onto the same chip or in the same package as the sensing elements. Alternatively it can be carried out externally on appropriate circuitry, or using appropriate software running on conventional processing hardware.

Another aspect according to the invention provides a method of manufacturing a sensor, having the steps of forming planar sensing elements on a substrate, orientated in different directions to sense displacements in different directions, forming movable electrodes by etching to release parts of the sensing elements, and forming interface circuitry on the same substrate, coupled to the movable electrodes, the interface circuitry being arranged to combine displacement signals from the different sensing elements to determine rotational displacement and multi-axial linear displacements.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF EMBODIMENTS

Figure 1:
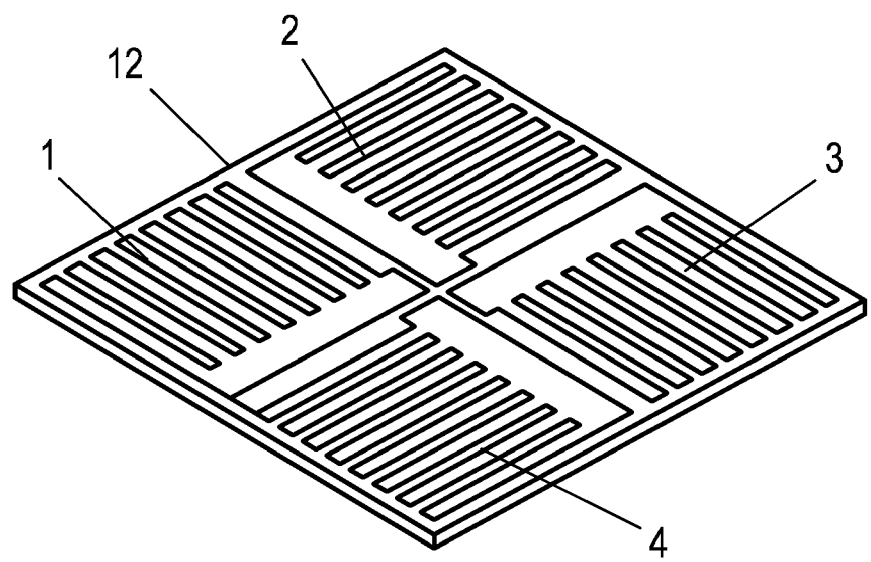
FIG. 1 shows a perspective view of sensing elements in the form of four comb drives according to an embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

At least some of the embodiments of the invention are concerned with an inertial sensing device such as a multi-axial, e.g. triaxial, accelerometer which includes a plurality of sensing elements. In addition, embodiments of the present invention may provide a combination of a high-end accelerometer with the feature of gyroscopic sense response, arranged for ease of manufacture based on manufacturing process capabilities for integrating layers on a substrate.

Accordingly embodiments of the present invention may provide an inertial sensing device including multiaxial sensing capability combined with rotational sensing capability.

In order to make the system more cost effective, in some embodiments, the sensing elements are formed on a single semiconductor substrate, e.g. a silicon substrate, to support the drive for miniaturization with better features, as two individual elements are replaced with a "single sensing element".

Some embodiments show a multi-axial gyroscopic-accelerometer, aiming at miniaturization of the component by integrating the sensing action of the gyroscope with that of the accelerometer along the three axes. The sensor may be a capacitive multi-axial gyroscopic-accelerometer (CMAGA). The sensing device according to the present invention makes use of movable sensing electrodes. Movement of these electrodes under an applied force changes the value of a physical property especially an electrical property of the device, e.g. its capacitance. Other types of sensing, other than capacitive sensing, can be used, such as magnetic or inductive or combinations of any of these. In the following the present invention will be illustrated mainly with respect to a capacitive sensing device but this is by example only. The feature of sensing displacement along an axis of rotation, perpendicular to the plane of the substrate, is also incorporated in some embodiments.

Referring to FIG. 1, the device comprises sensing elements in the form of four comb drives 1, 2, 3, and 4 patterned on or in a proof mass, the sensing elements being insulated electrically from each other, and orientated in different directions in a plane. The device may be an inertial sensor such as a multi-axial gyroscopic-accelerometer. As shown the four different directions are in two main perpendicular directions. The proof mass may be made from a semiconductor material e.g. it may be made from polysilicon. The four comb-drives 1-4 are preferably anchored to a substrate 12 individually, e.g. each via an anchoring point. In embodiments of the present invention, when a displacement occurs on the proof mass of the device, i.e. when it is subject to a force, the capacitance values in the four comb-drives 1-4 vary with this applied force, e.g. proportionally or non-linearly. The capacitance values in the four comb-drives 1-4 vary based on the force applied on the proof-mass according to the orientation of each of the comb-drives 1-4 because the proof mass as represented by the sensing electrodes is able to move with respect to the substrate 12. Hence, the proof mass is formed at least in part from the movable sensing electrodes. The electrical properties, e.g. capacitance values of the four sensing elements remain the same at the mean or rest position. When a force is applied there is movement of the sensing electrodes of the comb drives or there is a displacement thereof because of distortion of the substrate 12 resulting in different relative or absolute positions for the sensing electrodes. These different absolute or relative positions result in a change in a physical, e.g. electrical property of the device, which can be measured for example by sensing the capacitance of the comb drives. If after manufacture there is a difference between expected capacitance value and real capacitance value or any of the combs, i.e. the capacitances are not balanced, this can be addressed during factory testing or field calibration of the sensor and any discrepancy can be corrected by applying a trimming step or by a learning step for the circuitry.

An example will be described with reference to FIG. 1 that shows four comb-drives, which are driven with appropriate drive signals to vibrate their masses if desired. Alternatively they may be driven in any way which enables their capacitance to be determined. For example, the four comb-drives are driven by an appropriate signal (e.g. sinusoidal) to vibrate their masses independently which enables their capacitance to be determined.

The combs 1-4 may be arranged as shown to occupy four quadrants of a square. The teeth of the combs (i.e. the sensing electrodes 10) may be arranged to face in four different directions around a central axis normal to the plane. These four directions may be arranged so that each direction is at right (perpendicular) angles to the direction of either of the adjacent combs.

Figure 2:
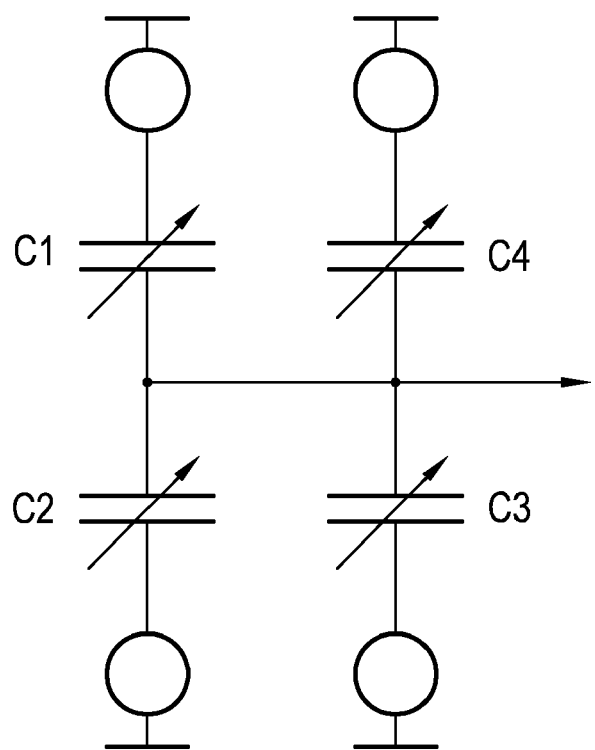
FIG. 2 shows a schematic view of an electrical equivalent circuit of the embodiment of FIG. 1, FIGS. 3 to 8 show views of an embodiment showing displacement vectors at different parts of the sensing elements, for linear displacements in x, y and z axes, and rotational displacements around x, y and z axes respectively.

FIG. 2 shows an electrical equivalent model of the embodiment of comb drives of FIG. 1. The model has variable capacitors C1, C2, C3, and C4 representing comb drives, each driven by a current source, each producing an output signal. Various different combinations of the signals from the four comb-drives with respect to each other may be obtained to provide signals representing linear displacement in all possible directions and rotational displacement in all directions. These six types of displacements are shown by the vector arrows in FIGS. 3 to 8. By analysing the variations in capacitances the relevant movements may be derived as follows.

Figure 3:
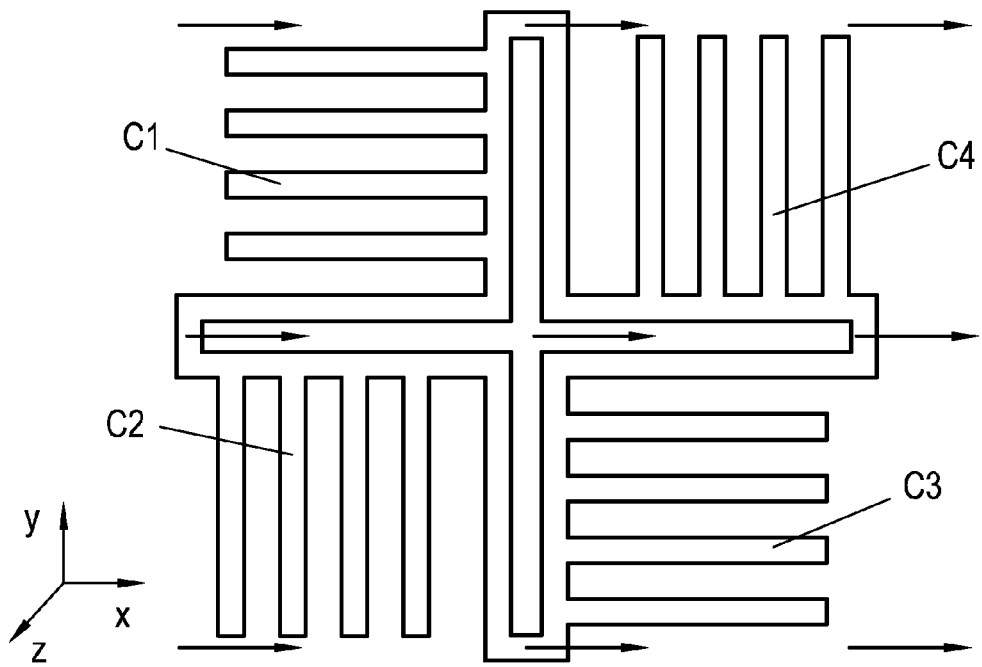

FIG. 3 shows motion along X-axis, causing; $\Delta C2=\Delta C4>\Delta C1=\Delta C3$, because motion along the direction of the fingers will have a greater effect on the capacitance than motion perpendicular to the fingers and parallel to the plane.

Figure 4:
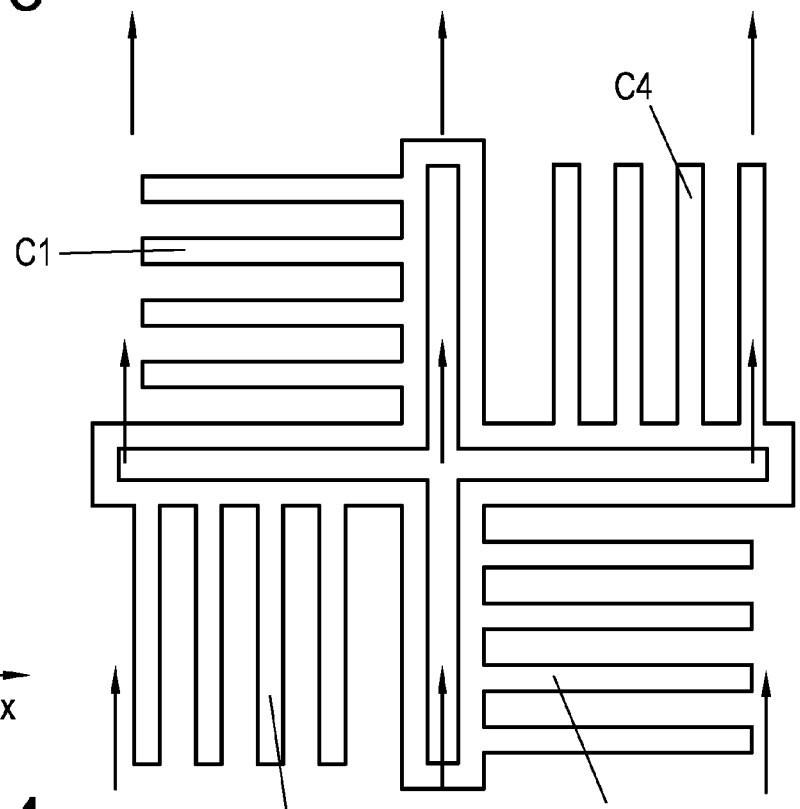

FIG. 4 shows motion along Y-axis, causing; $\Delta C1=\Delta C3>\Delta C2=\Delta C4$, for the same reasons.

Figure 5:
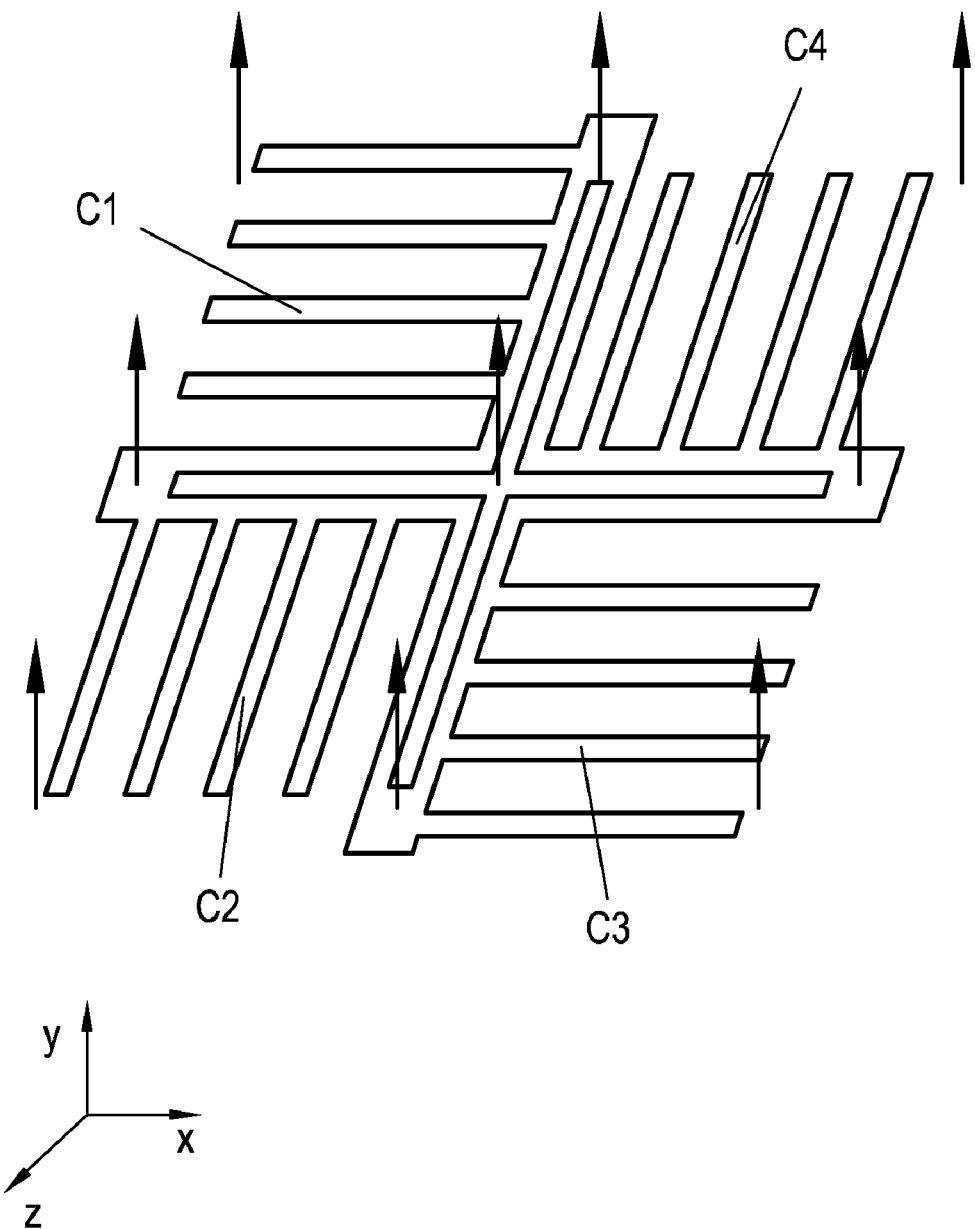

FIG. 5 shows motion along Z-axis, causing; $\Delta C1=\Delta C2=\Delta C3=\Delta C4$, because all the fingers will have the same motion either deeper into their slots in the substrate, or lifted out of their slots.

Figure 6:
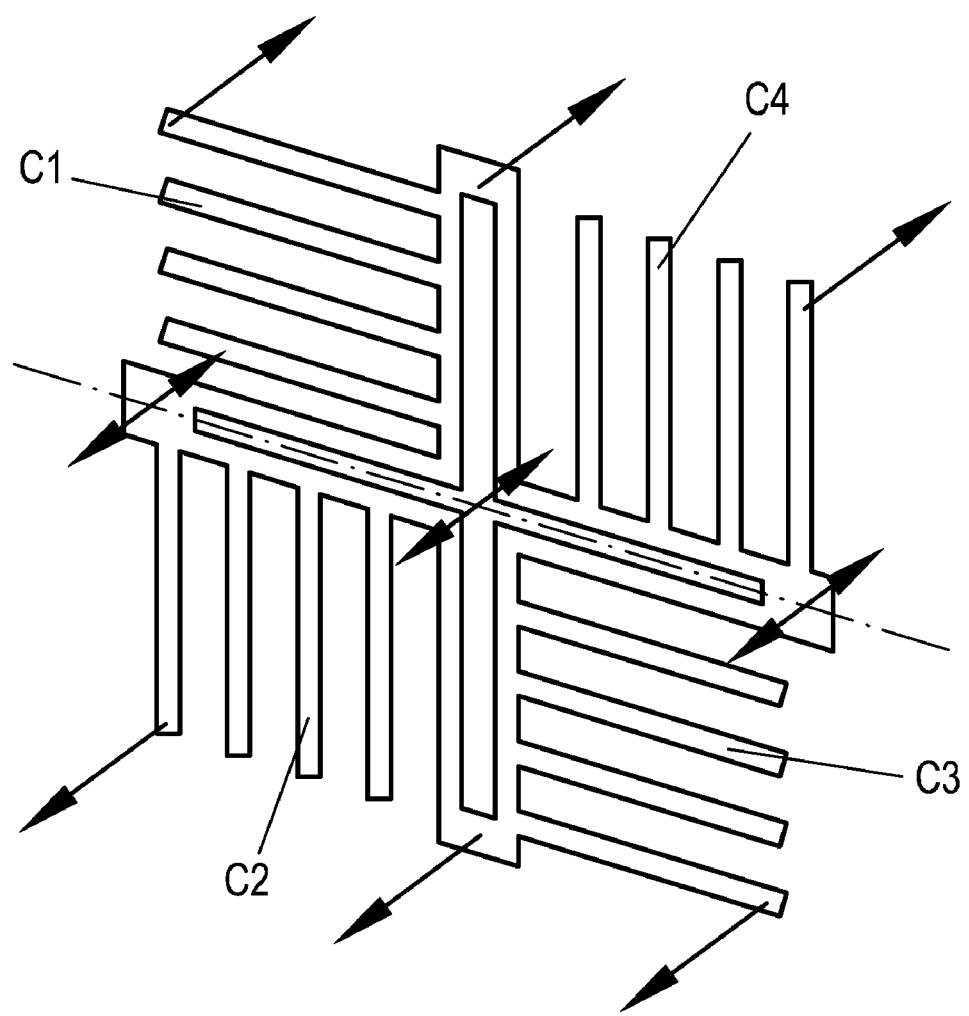
Figure 6:
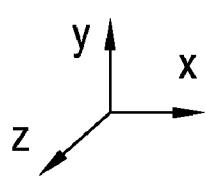

FIG. 6 shows rotational motion about the X-axis, causing; $\Delta C2+\Delta C3=\Delta C1+\Delta C4$. All finger's displacements are in the same orientation (positive sense).

Figure 7:
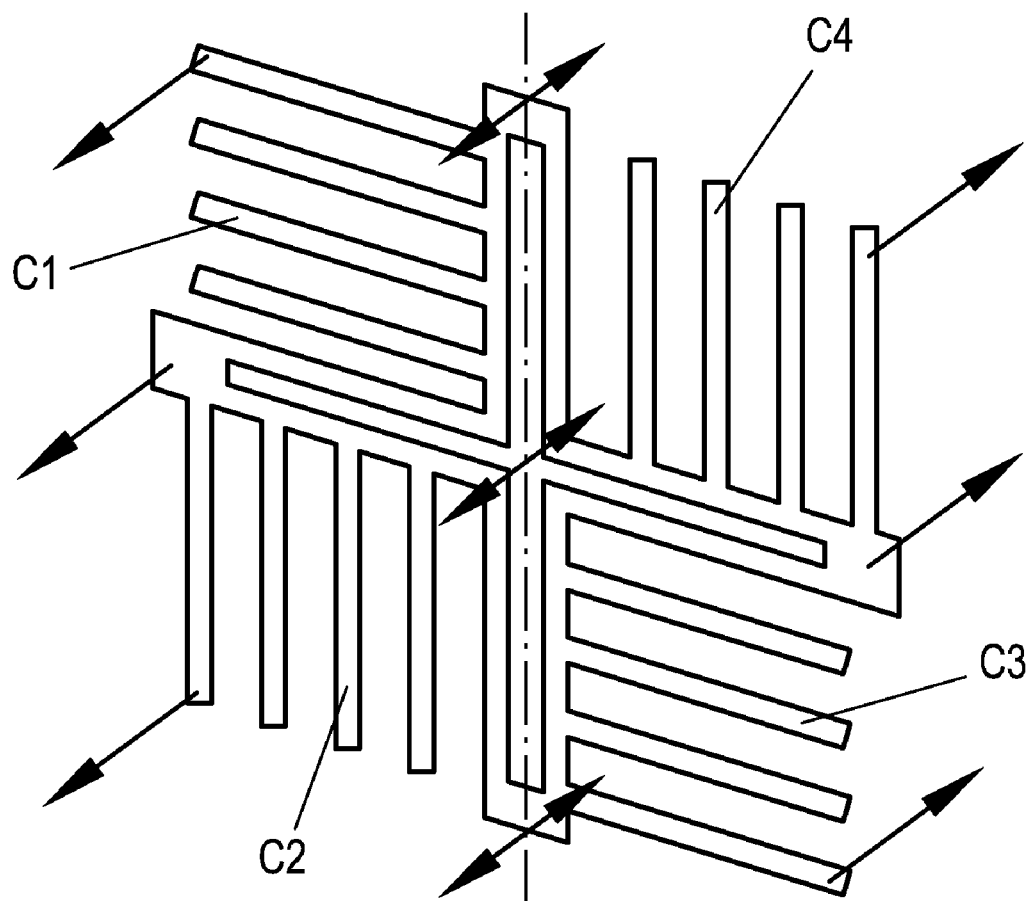
Figure 7:
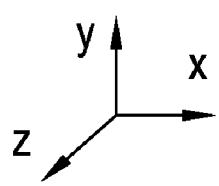
Figure 8:
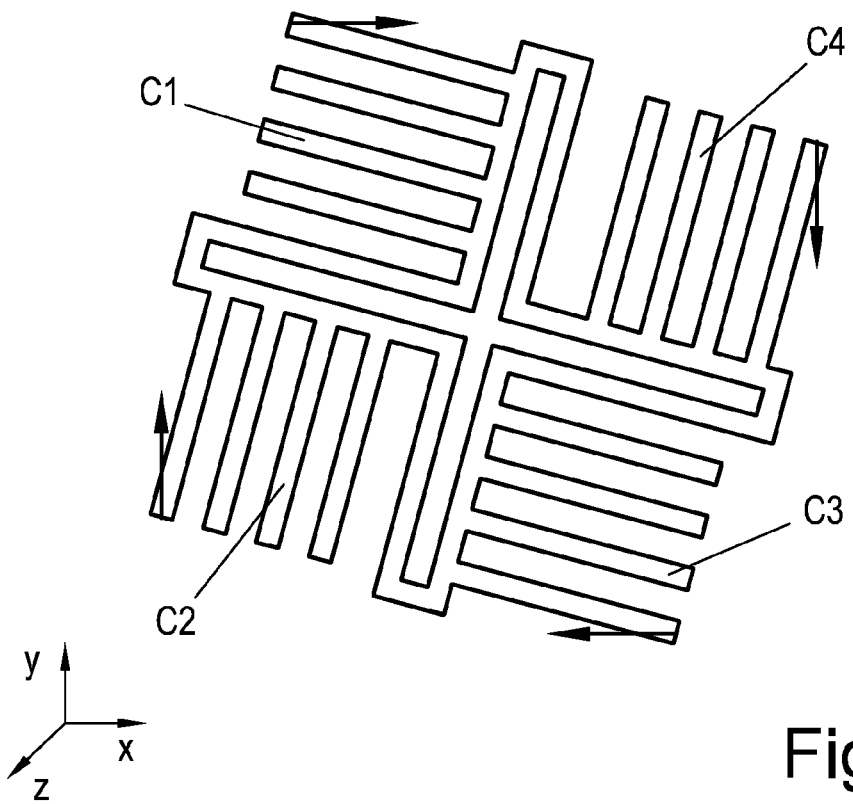
Figure 9:
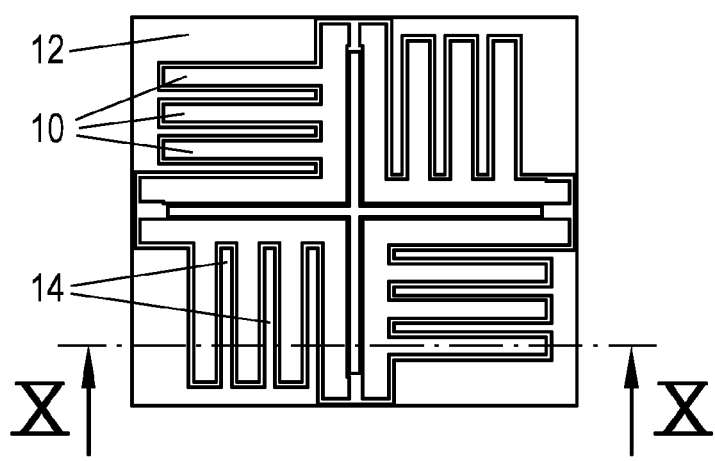
FIG. 9 shows a schematic arrangement of sensing electrodes in the form of four combs according to an embodiment of the invention.

FIG. 7 shows rotational motion about the Y-axis, causing; $\Delta C1+\Delta C2=-(\Delta C3+\Delta C4)$ FIG. 8 shows rotational motion about the Z-axis, causing; $\Delta C1=-\Delta C3; \Delta C2=-\Delta C4$ FIG. 9 shows signal processing circuitry arranged to determine which or how much of each of six states of the device is present in accordance with an embodiment.

An interface is provided having signal processing circuitry (see FIG. 11b for an example of logic circuits to process the signals) arranged to determine which or how much of each of these six conditions is present. The circuitry may be on-chip or off-chip.

The relevant movements that have been applied to the sensing device, e.g. an angular velocity of the substrate and components or linear accelerations of the substrate along multiple axes in the plane of the substrate, are thus deduced by combinations of the displacements sensed by the sensing elements. For example, when there is a displacement in the plane of the device there is a variation in two sets of comb fingers, e.g. only for example in the sets 1; 3. In this case there is no variation in the others combs drive 2 and 4. In this case there is no variation out of the plane. If there is a perpendicular displacement (out of the plane or with a component perpendicular to the plane), all of the capacitances will change at the same time with the same variation.

For embodiments with sensing elements able to sense additionally displacements in the z-axis, then differences between the displacements represents rotations about other axes, and then the interface signal processing circuitry may additionally be arranged to determine rotational displacements and hence angular velocities.

Figure 10:
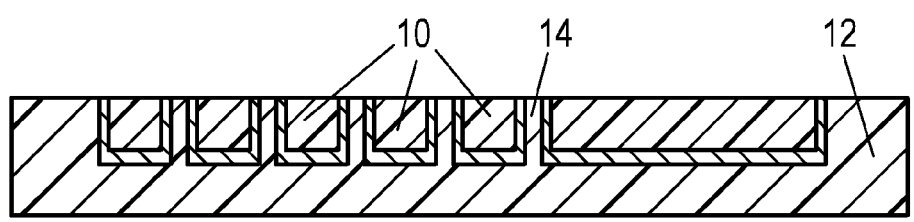
FIG. 10 shows a cross-sectional view at A-A in FIG. 9, showing sensing electrodes anchored on a substrate according to an embodiment of the invention.

The sensing electrodes are formed by free cantilevered movable fingers 10 of the comb drives 18 all on a substrate 12—shown in top view in FIG. 9 and cross-section A-A' in FIG. 10. The device includes a plurality of cantilevered sets 1-4 of movable comb fingers 10, each set anchored to an anchorage point 16 on a silicon substrate 12—see FIG. 11a. In between the fingers 10 are placed insulating static fingers 14 that can, for example be formed from the substrate 12, e.g. from silicon. For electrostatic elements, there will need to be a corresponding fixed electrode having a shape corresponding to the movable finger, and facing the finger. This can be implemented by a conductive layer on the static fingers. Other shapes than straight combs can be used, such as curved combs, curved around a central axis, or rectangular plane shapes for example. Any suitable number of fingers 10 of the sensing electrodes can be used. In principle the different comb drives need not be perpendicular to each other, so sets of three electrodes 10 placed at 120 degrees to each other can be used to obtain sensing of rotation and multi directional linear displacements. Other suitable numbers of sets of sensing electrodes such as 5, 6, 7, 8 or more can be used.

In a further embodiment, the present invention may provide an inertial sensing device such as an accelerometer fabricated on a single semiconductor substrate, e.g. a silicon substrate 12. The accelerometer can be manufactured based on available process technology. The four comb-drives 1-4 can form the structural part of the proof mass of the accelerometer or form part of it, e.g. if the proof mass is distributed over the combs 1-4 of movable electrodes of the sensing elements. The movable sensing electrode fingers 10 may be formed from a semiconductive material, e.g. they can be polysilicon, e.g. when formed on a silicon substrate 12, or other materials can be used. The comb drives 1-4 may be formed isolated from each other by patterning in a single photolithographic process.

The dimensions of the structure may be varied to suit the application. Sacrificial layers may be used during the manufacture, and then removed, e.g. by etching, to thereby release movable structures such as the sensing electrode fingers 10. For example, etch holes can be incorporated and used to help release the structure in case of the larger surfaces, following established practice. The method and the stability and rigidity of the anchorage points 16 of the combs, the mass of the sensing electrode fingers 10 and the material properties of the sensing electrode fingers 10 define the stiffness of the proof mass, i.e. the amount of movement of the sensing electrode fingers 10 when a force is applied. The amount of movement determines the magnitude of the change of the physical, e.g. electrical property of the combs, e.g. the change in capacitance. Apart from these factors, the holes for the release of the structure can contribute to the stiffness of the proof mass; the range of sensing varies with these parameters.

Some embodiments have the capability to sense displacement along the z-axis, which in this example is seen as an axis of rotation. In this particular embodiment, the proof mass contains four capacitive comb-drives electrically isolated from each other. The four comb drives of the accelerometer proof mass vary the capacitance with respect to the displacement and direction.

Accelerometers:

When the acceleration is constant, the rate of change of velocity with respect to time is constant which implies that the rate of change of displacement is constant with time. When there is a change in the acceleration, rate of change of velocity increases with respect to time and finally reflects on the rate of change of displacement. Since acceleration is measured by means of the position of the proofmass (i.e. displacement of the proof-mass), therefore the time is maintained constant. The frequency of sensing may be made constant with a help of a feed back loop.

For capacitive accelerometers the change in position of the proof-mass is sensed by the change in the capacitance. The disposition of the proof mass from the position of equilibrium or the mean position corresponds to the acceleration or the displacement corresponding to the square of the time. The change in capacitance gives the rate of change of displacement (velocity). The rate of change in the capacitance variation corresponds to the acceleration.

The accelerometer is shown having four comb-drives in the same plane oriented in different direction for sensing the displacement in X and Y axes of the same plane. The sensing of displacement along the Z-axis is characterized with a reference capacitor. The sensing of displacement along the axis of rotation is based on combining the outputs of multiple sensing elements, using interfacing electronic circuitry for example. The interface is designed based on the output required. The MEMS device provides the system with information in a crude form. The interface reads the information passed on by the device and the corresponding relation between the values is made to arrive at the required conclusion to analyze the result. The value is then manipulated to give the necessary information.

Table 1 below shows example specifications for two embodiments, a high end higher performance embodiment, and an entry level lower performance embodiment.

|  | High end | Entry |
|---|---|---|
| Acceleration measurement range | ±2 g | ±2 g |
|  | ±6 g | ±6 g |
| Offset (normalized) | <0.5 mg | <16 mg |
| Full performance temperature range | −30° C. to 85° C. | −30° C. to 85° C. |
| Offset temperature coefficient (before compensation) | <500 µg/° C. | <500 µg/° C. |
| After internal compensation | <100 µg/° C. |  |
| Axis mixing | <0.1% | <0.5% |
| Mordenexity (Best Fit) lower range | <0.1% | <1% |
| upper range | <2% | <5% |
| Noise | <100 µg/Hz | <500 µg/Hz |
| Output data rate (ODR) | 40 Hz, 100 Hz, 640 Hz, 2.5 kHz | 100 Hz |
| Bandwidth | DC to 1/3 ODR | DC ot 50 Hz |
| Turn on time | <10 ms | <10 ms |
| Resolution (BW 50 Hz, ±2 g) | <0.5 mg | <10 mg |
| Digital bus | SPI&3° C. | SPI&I° C. |
| Analog supply voltage (AVdd) | 2.50 V (±0.1 V) min. range | 2.50 V, (±0.1 V) min. range |
| Digital supply voltage (DVdd.10), only ref. for digital part | 1.8 V (±5%) | 1.8 V (±5%) |

-continued

|  | High end | Entry |
|---|---|---|
| Shockproof | 10000 g | 10000 g |
| Current Consumption (operational) | <700 μg | <350 μg |
| Idle | <10 μg | <10 μg |
| Package (SMD) | 2.0 mm × 7.0 mm × 2.5 mm | LGA-14, 5.0 mm × 3.0 mm × 1.0 mm |

Calculations for Accelerometer Measurement Range:

The acceleration is given as the rate of change of variation in displace with respect to time i.e. (distance/time$^2$). For sensing action the time is maintained constant. A sensing system with the help of an oscillator resonating at a particular frequency senses the displacement. The rate of change of value in the sensing system gives the value of acceleration. The sensitivity range of the device can be defined by the frequency at which the rate of change of value in the sensing system is observed.

Figure 11A:
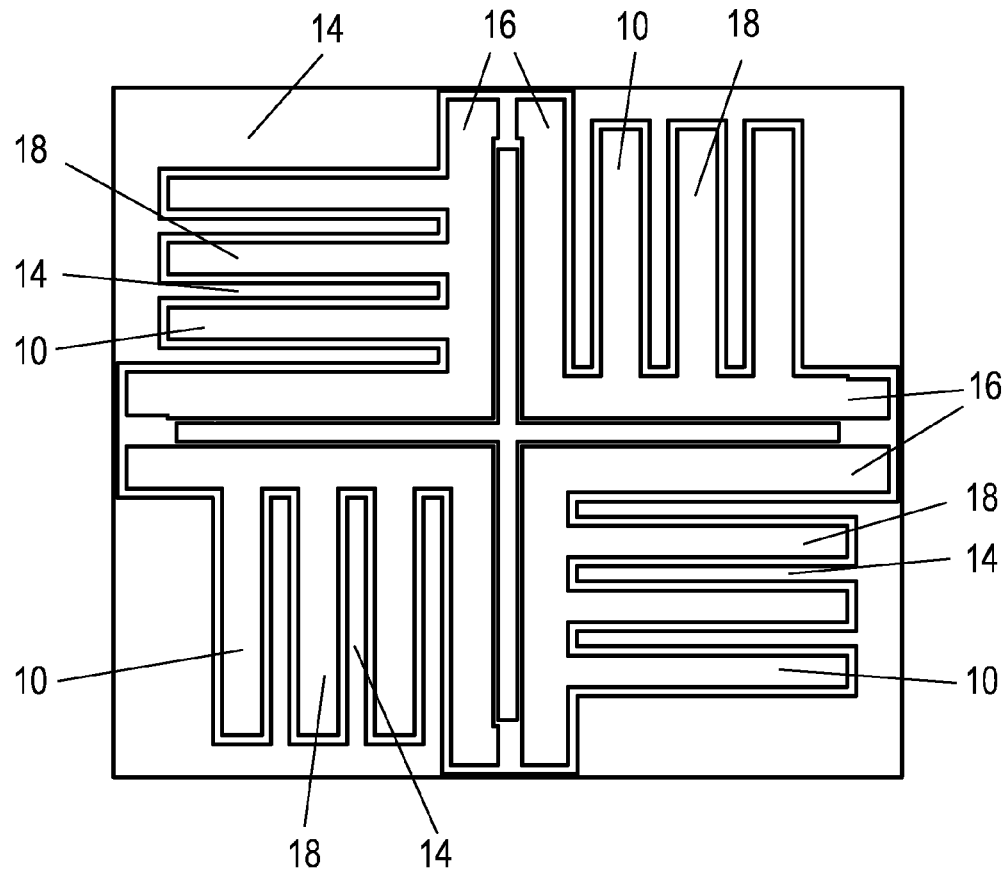
FIG. 11a shows a plan view of the sensing electrodes of sensing elements according to an embodiment of the invention.
Figure 11B:
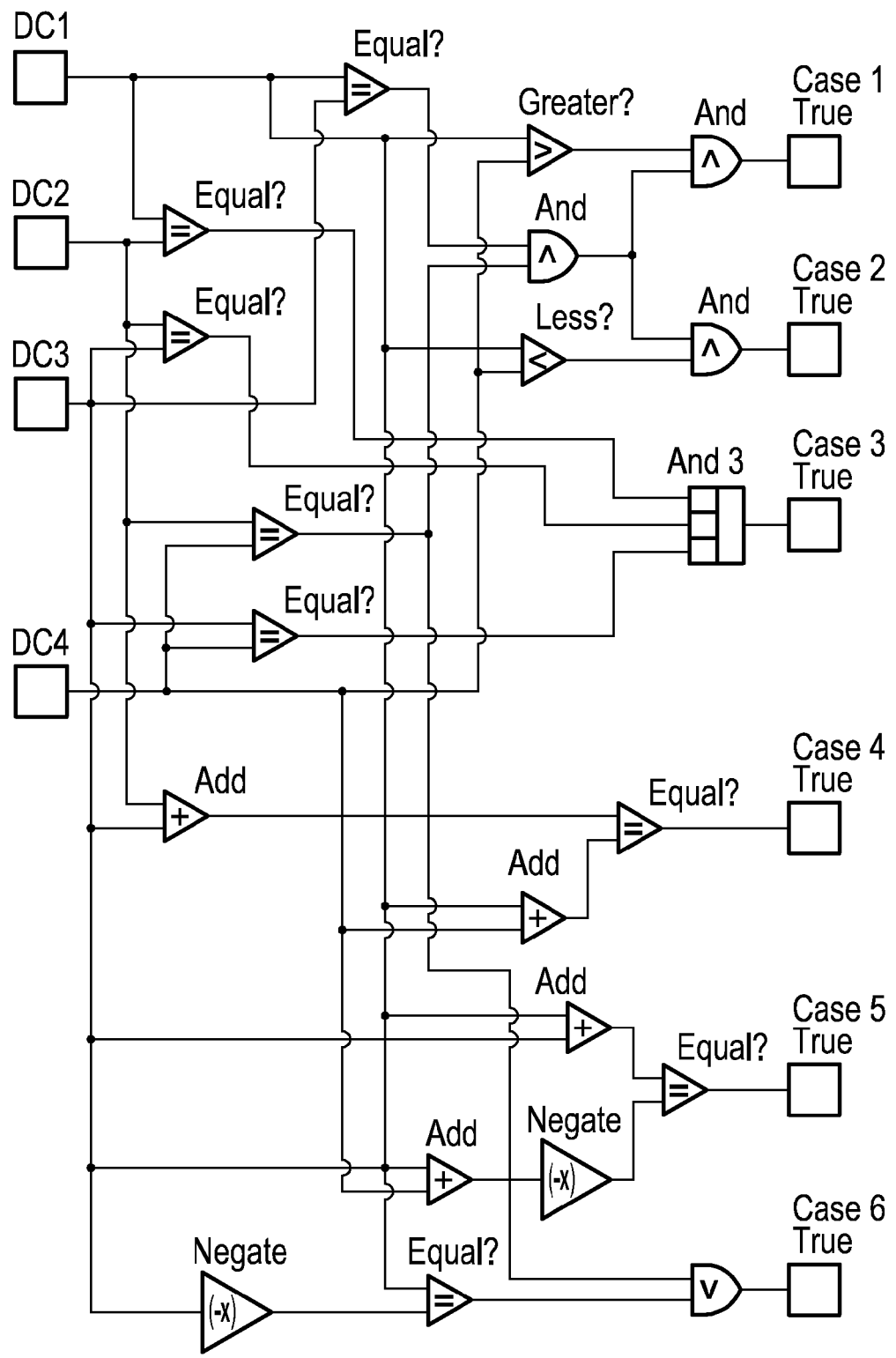
FIG. 11b shows a signal processing circuitry arranged to determine which or how much of each of the six states of the device is present.

Calculations for accelerometer measurement range:
Example 1.range=2 g=2×9.8=19.6 i.e. −2 g to +2 g (39.2)
$T^2$=(d/(2*2 g))=1.02040816326531 E−08
T=0.000101015254455221
Required freq. is 9899.49493661167 i.e. 9.9 KHz
Example 2.range=6 g=6×9.8=58.8 i.e. −6 g to +6 g (117.6)
$T^2$=(d/(2*6 g))=3.40136054421769 E−09
T=0.0000583211843519804
Required freq. is 17146.4281994822 Hz i.e. 17.2 KHz
Example 3.range=8 g=8×9.8=78.4 i.e. −8 g to +8 g (156.8)
$T^2$=(d/(2*8 g))=2.55102040816327 E−09
T=0.0000505076272276105
Required freq. is 19798.9898732233 Hz i.e. 19.8 KHz
Simulations:

The proposed design may be simulated for the mechanical properties to give the different modes of displacement. In the present case the simulation has been performed on a preliminary structure as shown in FIGS. 9, 10 and 11a. The first three modes of displacements are along the X, Y and Z directions respectively as shown in FIGS. 3, 4 and 5 respectively. Furthermore the subsequent two modes of displacement correspond to the rotational displacement of the proof mass about the X axis or Y axis passing through the centre of the proof-mass, as shown in FIGS. 6 and 7 respectively. Furthermore the sixth mode of displacement shown in FIG. 8 corresponds to rotation about the Z axis, gyro effect. Hence it can be seen that the low-end gyroscopic displacement may also be sensed in this design of accelerometer. The gyro effect can be obtained directly from the rotation around Z since this rotation can be measured. By using the Coriolis Effect, a 1-Dimensional gyrometer may be obtained.

Figure 12:
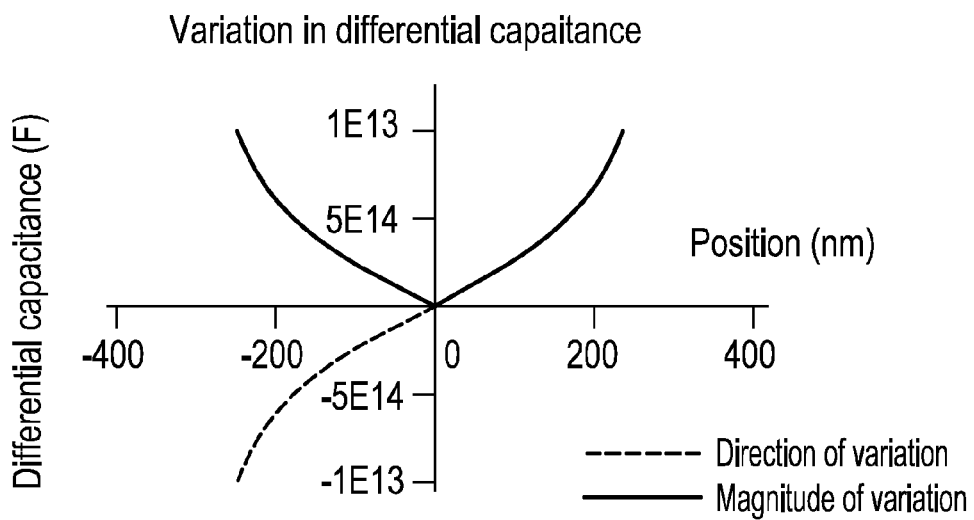
FIG. 12 shows a graph of a profile of difference in sensing element capacitances with displacement along X or Y.
Figure 13:
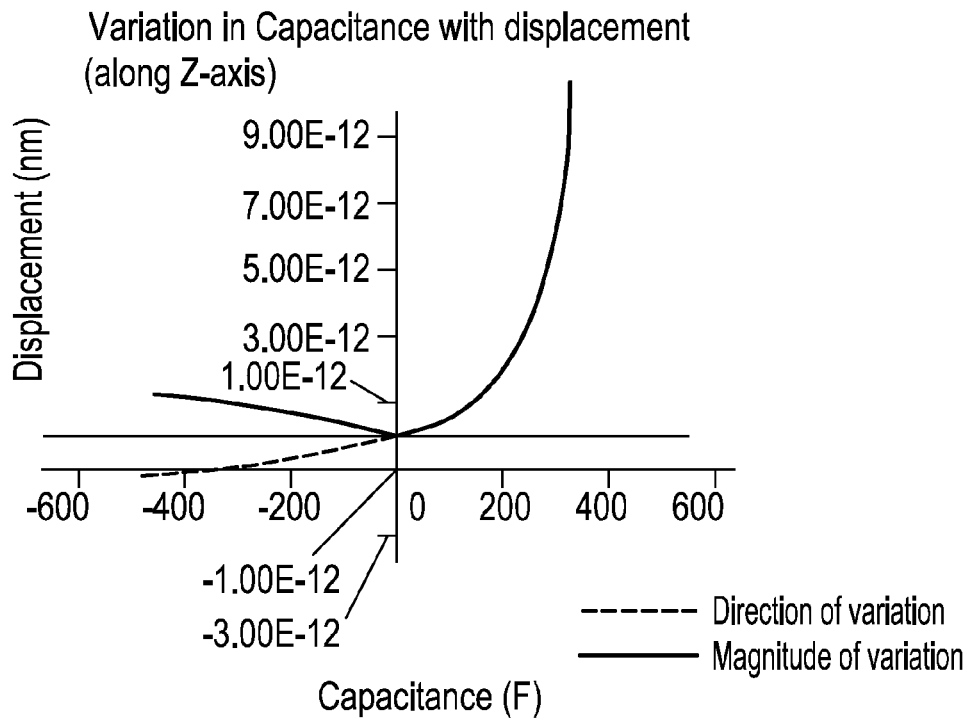
FIG. 13 shows a graph of variation of capacitance with displacement along a z-axis perpendicular to a plane of the sensing elements.
Figure 14:
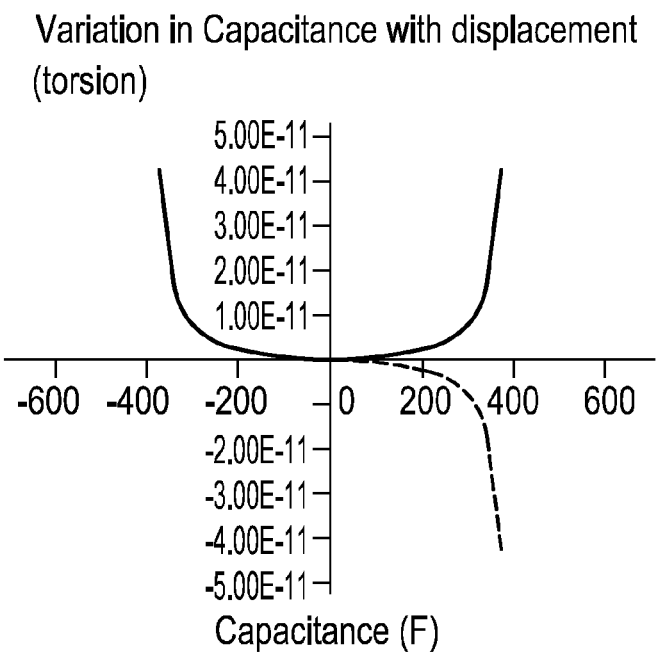
FIG. 14 shows a graph of variation of capacitance with rotational displacement.

FIGS. 12, 13 and 14 shows graphs of change in capacitance:

In FIG. 12, the first variation value is with respect to the lateral in-plane, X or Y direction displacements whereby the differential capacitance between two of the comb-drives is measured, following the relationship explained above with respect to FIG. 3 or 4 respectively. The value of capacitance changes with respect to the displacement pronounced on the system with respect to time. The change in the value of capacitance is sensed with a particular frequency the rate of change of value gives the acceleration. The graphs are plotted based on the theoretical change in the value of the capacitance. The change is almost linear to displacement of the proof-mass.

The variation shown is along the X and Y-axes; the variation has no fixed reference capacitor. The variation is the difference between the increase in the capacitance value in one comb-drive to the corresponding decrease in the other comb-drive. Hence the value is twice the value of (∂C/C) in other case. In an embodiment, the values can be obtained by signal processing by two different interface circuits to implement the relationships described above for FIGS. 3 and 4 respectively. These can be implemented by conventional analog or digital circuitry.

In FIG. 13, a second variation value is shown, based again on a simulation, with respect to the displacement in the Z direction, e.g. differential capacitance with respect to a reference such as a fixed capacitor. Hence the variation is (∂C/C). As a result of this the curve is less linear than to the corresponding variation in the X or Y-axis. The simulation to obtain the values may be carried out using the relationship described above for FIG. 5. In an embodiment, the values can be obtained by signal processing circuitry to implement the relationship.

To initialise or calibrate the device, the change in the value of capacitance with respect to the position of the proof-mass may be calculated or measured for calibration purposes. The value of capacitance changes with respect to the displacements of the system, i.e. displacements of the movable sensing electrodes, with respect to time and this depends upon the accelerations that the device experiences. The change in the value of capacitance is sensed with a particular frequency, and the rate of change of value gives the acceleration.

It may be noticed that the change is almost linear with displacement of the proof-mass. The variation shown in FIG. 12 is along the X and Y-axes; the variation is not relative to a fixed reference capacitor. The variation is the difference between the increase in the capacitance value in one comb-drive to the corresponding decrease in the other comb-drive. That is, a relative measurement is made. Hence the value is twice the value of the rate of change of capacitance (∂C/C) compared to other cases in which there is a comparison with a fixed capacitor (or alternatively no reference).

The arrangement of sensing elements may sense displacement made in circular rotation and is useful to determine angular velocity according to known gyroscopic principles. The sensing of the motion (displacement) of the proof-mass in an in-plane rotational axis can be explained as follows. The calculation of change in the capacitance value is carried out as per the relationships described above for the rotations shown in FIGS. 6 and 7. The results are illustrated in the graph of FIG. 14, based on a simulation. In an embodiment, the interface circuitry can be arranged to implement the relationships using conventional circuitry to produce signals representing the rotation.

The variation shows a non-linear curve due to process limitations as shown in the case of the variation in the value of capacitance along the Z-axis. The process limitation is due to the gap between the moving part and the substrate, in fact the structure can not move far in |−z| direction without collapse to the silicon. A fifth comb drive may be used to help overcome this limitation. This could be implemented using a top layer in Aluminum for example, normally used for contact pads. This layer may be used for a fifth comb drive, and dedicated to z direction without change in the rest of the design. The four combs adjacent to each other will give the displacement in the X and Y directions and the fifth comb drive on the top layer can dominate the displacement in the Z direction.

In any of the embodiments of the present invention, either relative sensing, i.e. between sensor elements mounted on the sensing device, or sensing with respect to a fixed capacitor can be implemented. A combination of outputs from each of the comb drives is derived, based on the logic explained above. The interpretation of the data provided by the sensing element will be controlled by the interfacing system. The size of the design will dominate the specification for a particular application. The processing logic for interpretation will dominate the sensing system.

There are types of accelerometer such as piezo-electric sensors with 3 different directions of sensing, but capacitive sensors do not intrinsically indicate directions.

Thermal Simulation:

The structure was simulated between −40° C. and 120° C. Since there was no resonance up to the sixth mode of displacement, there is little effect of temperature on the structure. Though subsequent modes of displacement pronounce a resonance at a relative high frequency comparatively the thermal sensitivity of the structure at higher modes of displacement is quite high of the order of 15-16 ppm/° C. The effect of thermal sensitivity remains consistent throughout the higher modes of vibration.

Manufacturing

Figure 15:
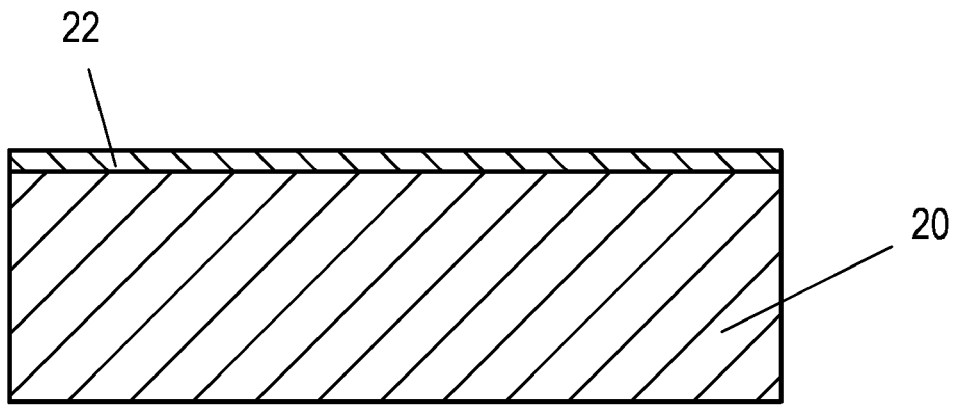
FIGS. 15 to 42 show process steps for the manufacture of a device like a multi-axial gyroscopic-accelerometer in accordance with an embodiment of the present invention
Figure 16:
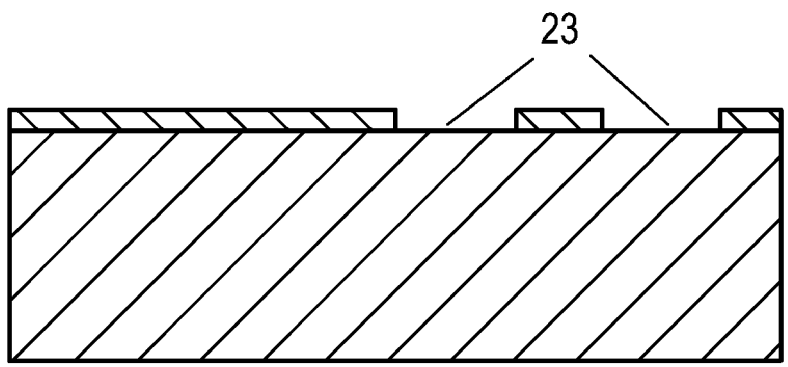
Figure 17:
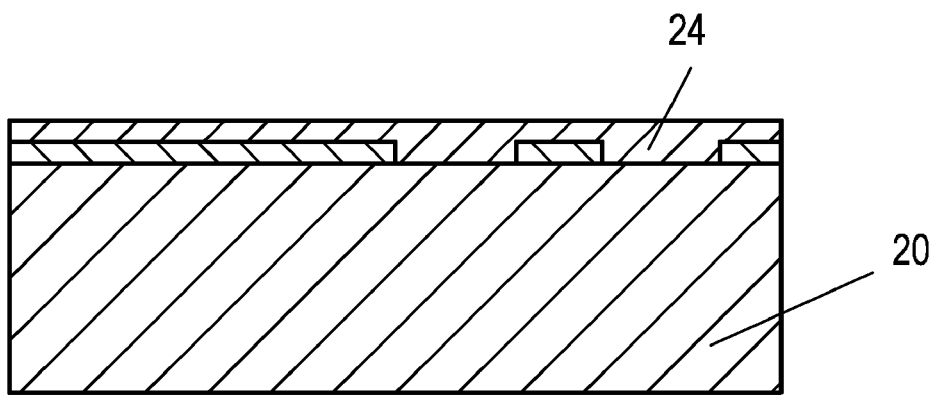
Figure 18:
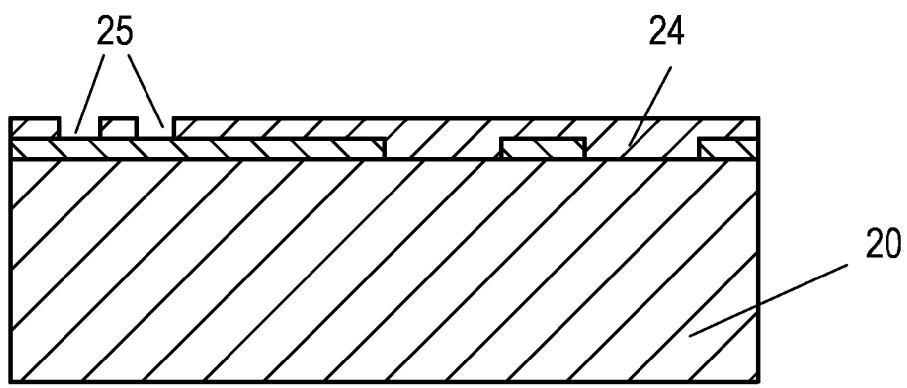

The sensing elements can be integrated by MEMS process steps and the interface circuitry can be integrated on the same substrate by other process steps such as a PiCS process (Passive Integration Connective Substrate). An example of a manufacturing process for the device may have the following steps described with reference to FIGS. 15 to 42:

First of all a masking layer such as a TEOS layer 22 is deposited on a suitable substrate 20, e.g. a silicon substrate (FIG. 15). Then the TEOS layer 22 is patterned, e.g. by conventional micro lithographic methods of depositing a photoresist, illumination of the resist with a light pattern, selective solvent removal of the resist layer and an etch process to provide a first pattern 23 in the TEOS layer 22 (FIG. 16). Then a photo-resist layer 24 is deposited over the whole substrate (FIG. 17) and is subsequently patterned e.g. by illumination with a light pattern and conventional selective solvent removal methods, to thereby expose a second pattern 25 on the TEOS layer 22 (FIG. 18). The second pattern 25 in the photo-resist layer 24 is at a different position than the first pattern 23 in the TEOS layer 22.

Figure 19:
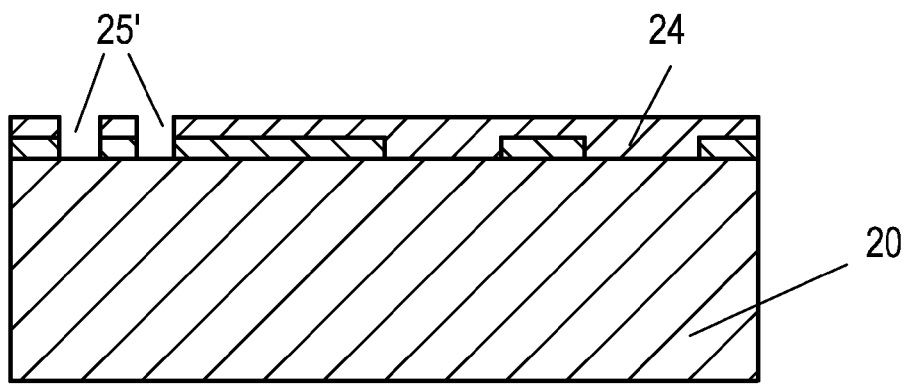

Using the pattern 25 in the photoresist layer a second pattern 25' is formed in the TEOS layer 22, by an etch process (FIG. 19). The TEOS layer 22 is removed at the positions of the second pattern 25.

Figure 20:
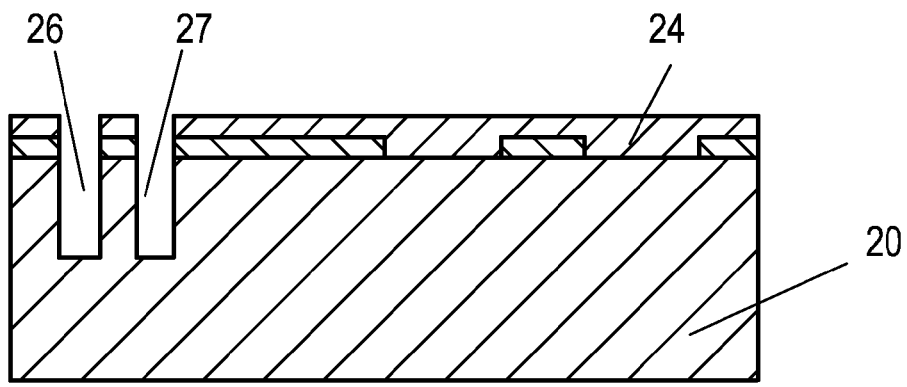

Then the substrate 20 is etched using the photoresist layer 24 and the TEOS layer 22 as a mask to form trenches, e.g. two trenches 26, 27 (FIG. 20). An anisotropic etch method is used such as a DRIE process to thereby provide deep narrow trenches.

Figure 21:
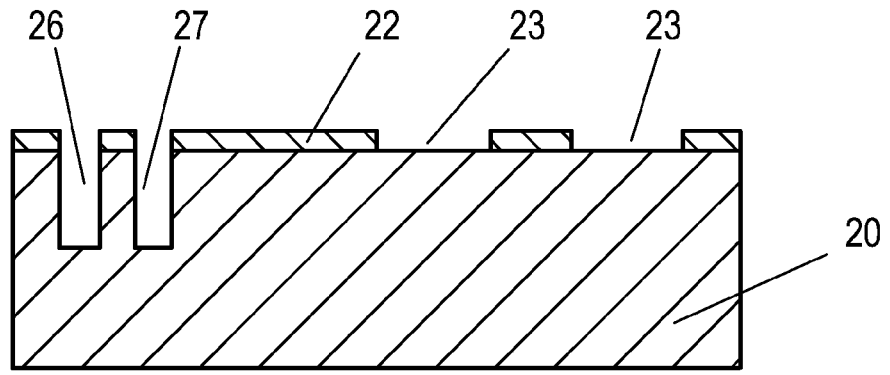

Then the photo-resist layer 24 is removed (resist stripping) by conventional means (FIG. 21). This also exposes the first pattern 23 in the TEOS layer 22.

Figure 22:
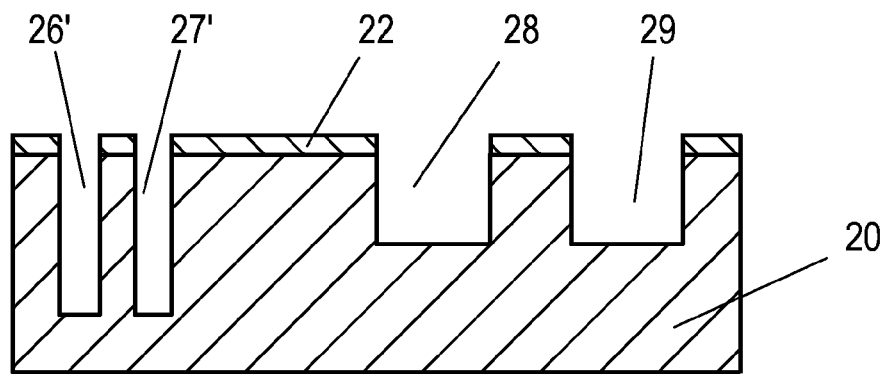

Then the substrate 20 is etched using an anisotropic etch process, e.g. by a DRIE process, using the TEOS layer 22 as a mask. The substrate 20 is now etched at the positions of the first and second patterns 23, 25' in the TEOS layer 22. At the positions of the first and second patterns, trenches 28, 29 and 26', 27' are formed, respectively, in the substrate 20 (FIG. 22). The trenches 26', 27' are deeper than the trenches 28, 29 due to the double etching step in their formation to thereby provide deeper capacitors (PICS process).

Figure 23:
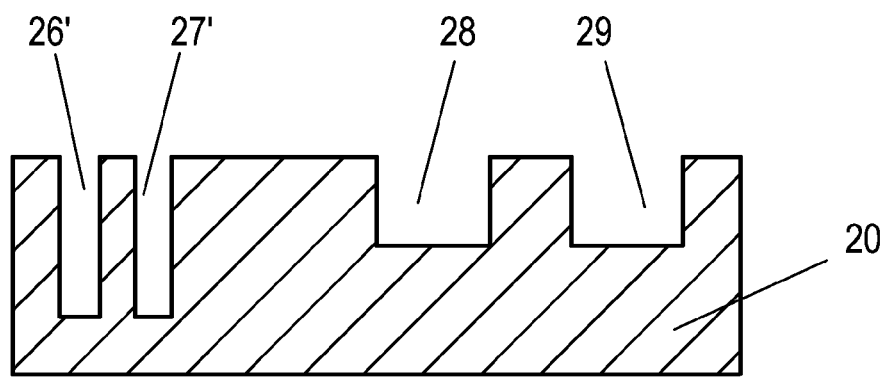

Subsequently the TEOS layer 22 is removed (FIG. 23).

Figure 24:
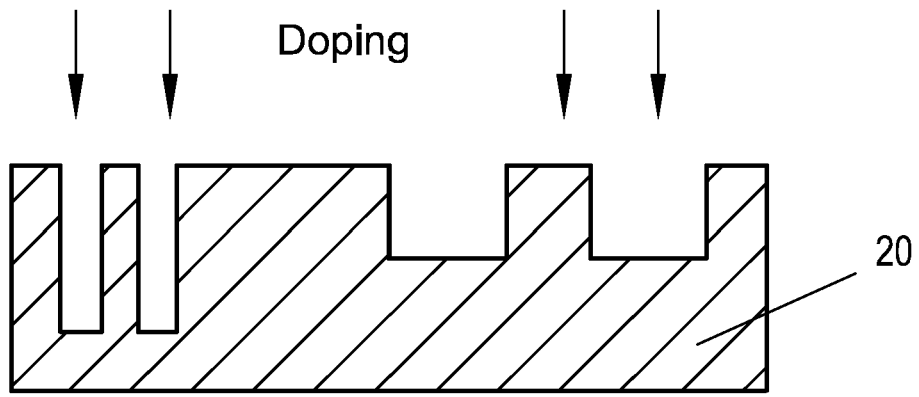

The substrate 20 is now doped by glass phosphor (10 ohm square), for example (FIG. 24).

Figure 25:
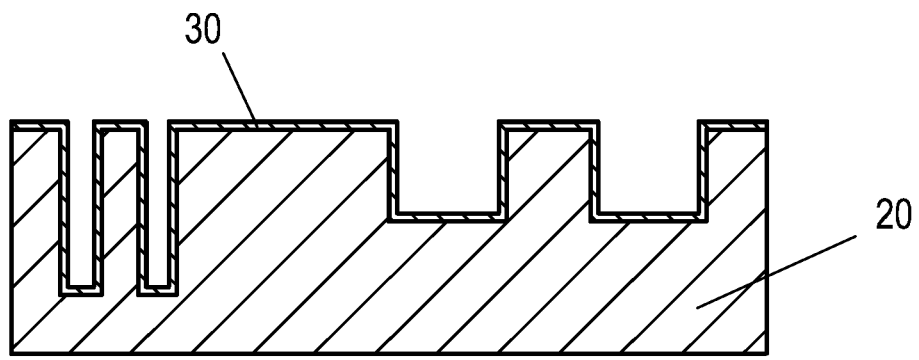
Figure 26:
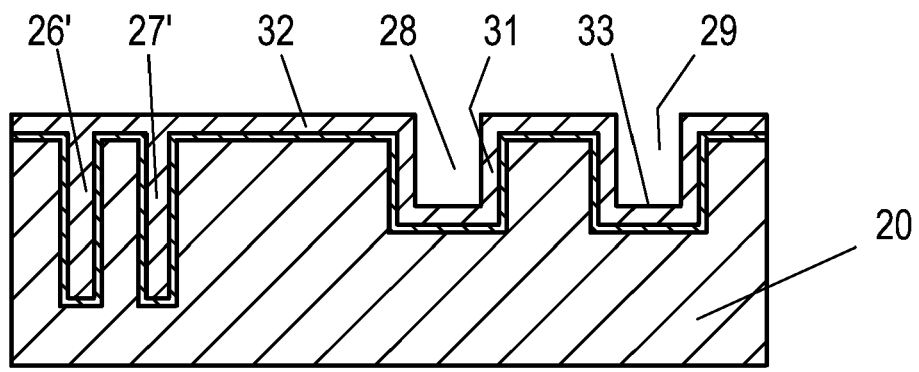
Figure 27:
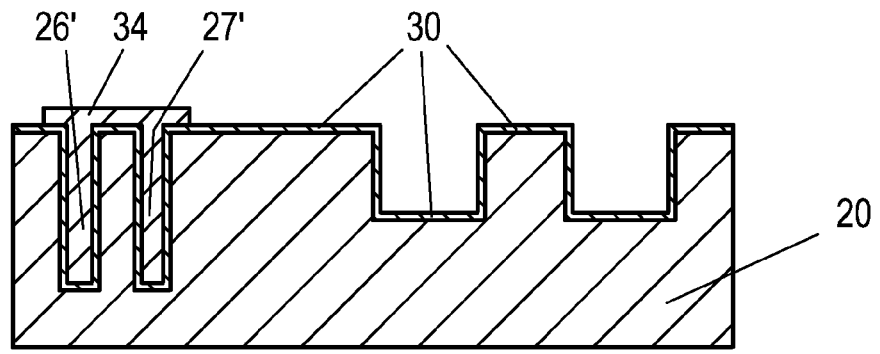
Figure 28:
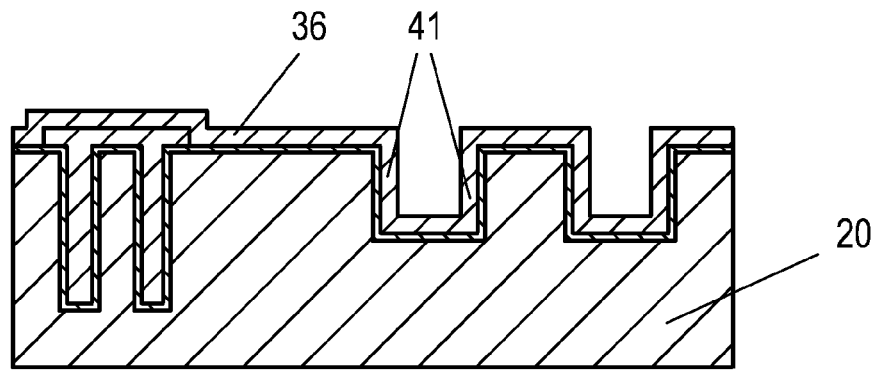
Figure 29:
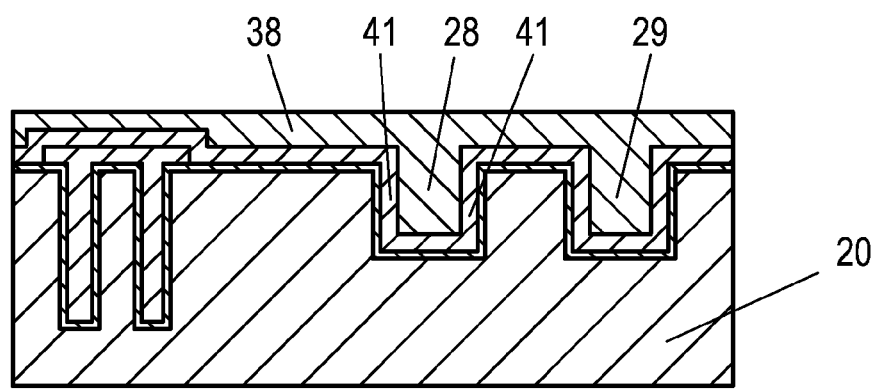
Figure 30:
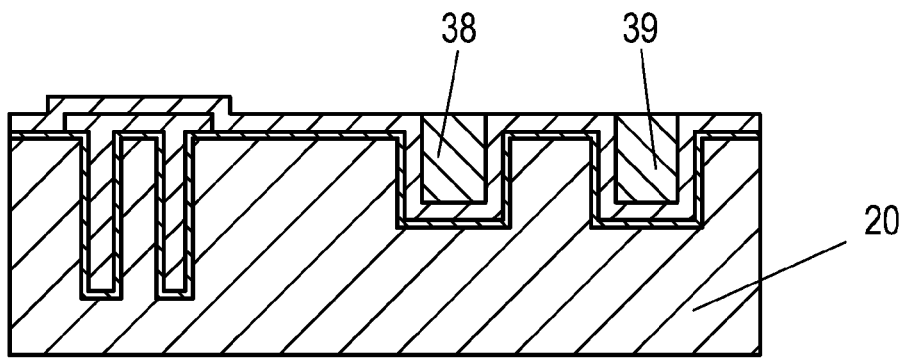
Figure 31:
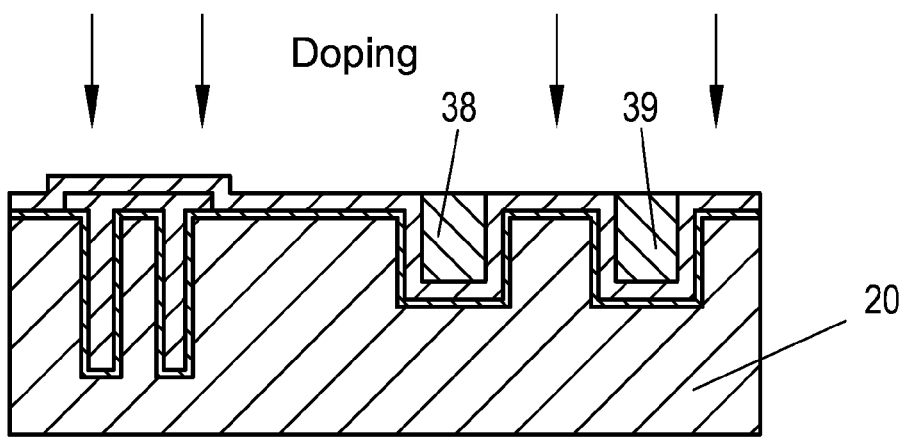
Figure 32:
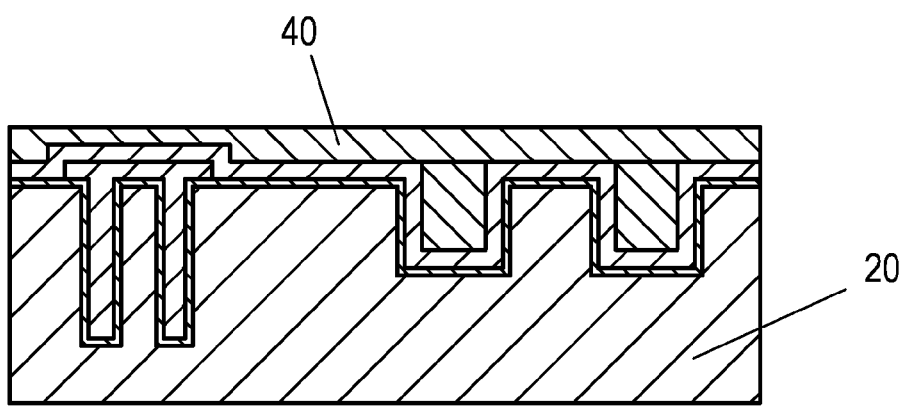

Subsequently, an insulating layer such as an ONO layer 30 is deposited over the whole substrate 20 to form an insulating layer 30 (FIG. 25). The ONO layer 30 coats the sides and bottom of the trenches 26', 27'; 28, 29 without filling them up. Accordingly, the ONO layer 30 forms a layer over the substrate 20 and on the walls and bottoms of the trenches 26', 27'; 28, 29. A polysilicon layer 32 is then deposited over the whole substrate 20. The polysilicon layer 32 fills up the narrow and deeper trenches 26, 27 but not the wider shallower trenches 28, 29 (FIG. 26). The polysilicon layer 32 is then patterned using conventional micro lithographic methods such as deposition of a photoresist, illumination with a pattern of light and subsequent selective removal of the resist layer. The polysilicon layer 32 is left only in the deep trenches 26', 27' formed with the help of the second pattern 25 (FIG. 27) resulting in a top layer 34 that connects these trenches. Then an oxide layer 36 is deposited over the whole of the substrate 20 thus applying an insulating layer 36 onto the polysilicon 34 above the trenches 26', 27' formed using the second pattern 25 and onto the walls and bottoms of the trenches 28, 29 formed using the first pattern 23 (FIG. 28). In particular the oxide layer 36 is deposited on the walls of the trench 28 to form wall coatings 41. Then a thick layer 36 of polysilicon is deposited over the whole substrate 20. The thick polysilicon layer fills up the trenches 28, 29 (FIG. 29). This polysilicon layer 36 is trimmed to leave polysilicon 38 and 39 in what is left of the trenches 28, 29 formed using the first pattern 23 as a mask (FIG. 30). The substrate 20 is now doped by glass phosphor (10 ohm square), for example (FIG. 31).

Figure 33:
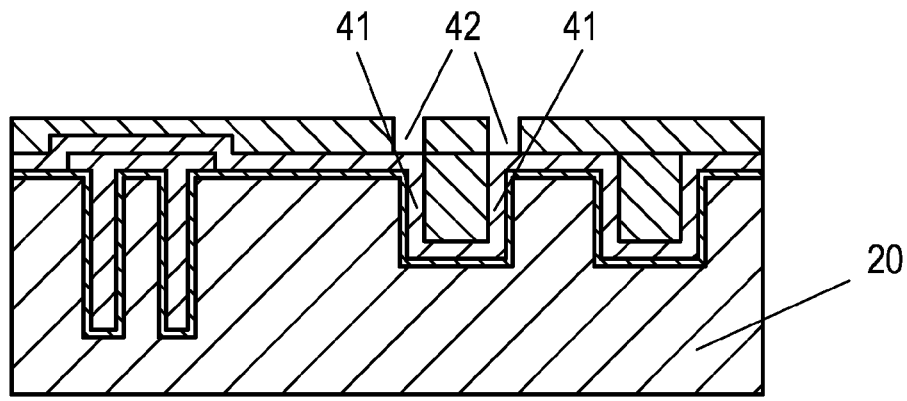

Then a photo-resist layer 40 is deposited over the whole substrate 20 (FIG. 32) and patterned, e.g. by conventional techniques to form openings 42 in the photo-resist layer aligned with the wall coatings 41 of the one of the trenches 28, 29 formed using the first pattern 23, i.e. the openings 42 are aligned with the vertical oxide layer 41 deposited on the side of this trench (FIG. 33).

Figure 34:
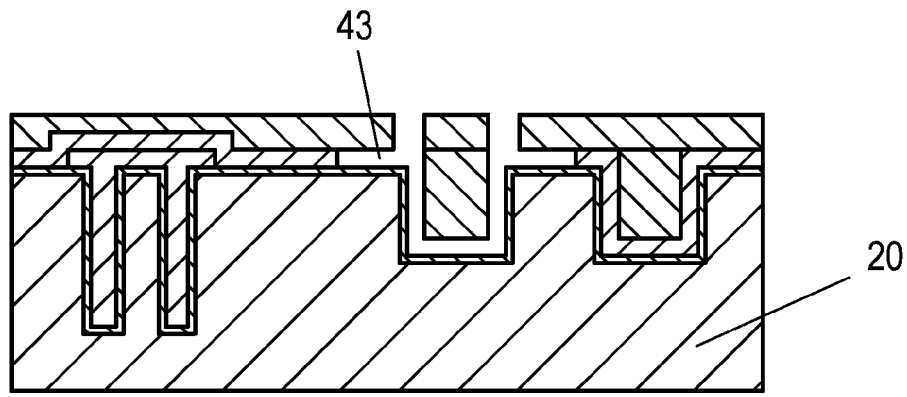
Figure 35:
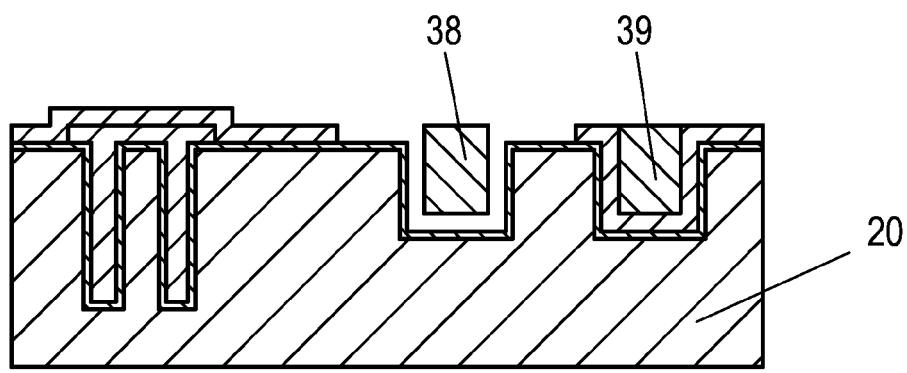

The oxide 41 on the walls and bottom of the one trench 28 made using the first pattern 23 is then removed, e.g. using a wet etching technique. This etching technique can be isotropic which results in an undercut 43 on either side of the polysilicon 38, underneath the resist layer 40 (FIG. 34). The photo-resist layer 43 is then removed (resist stripping) (FIG. 35).

Figure 36:
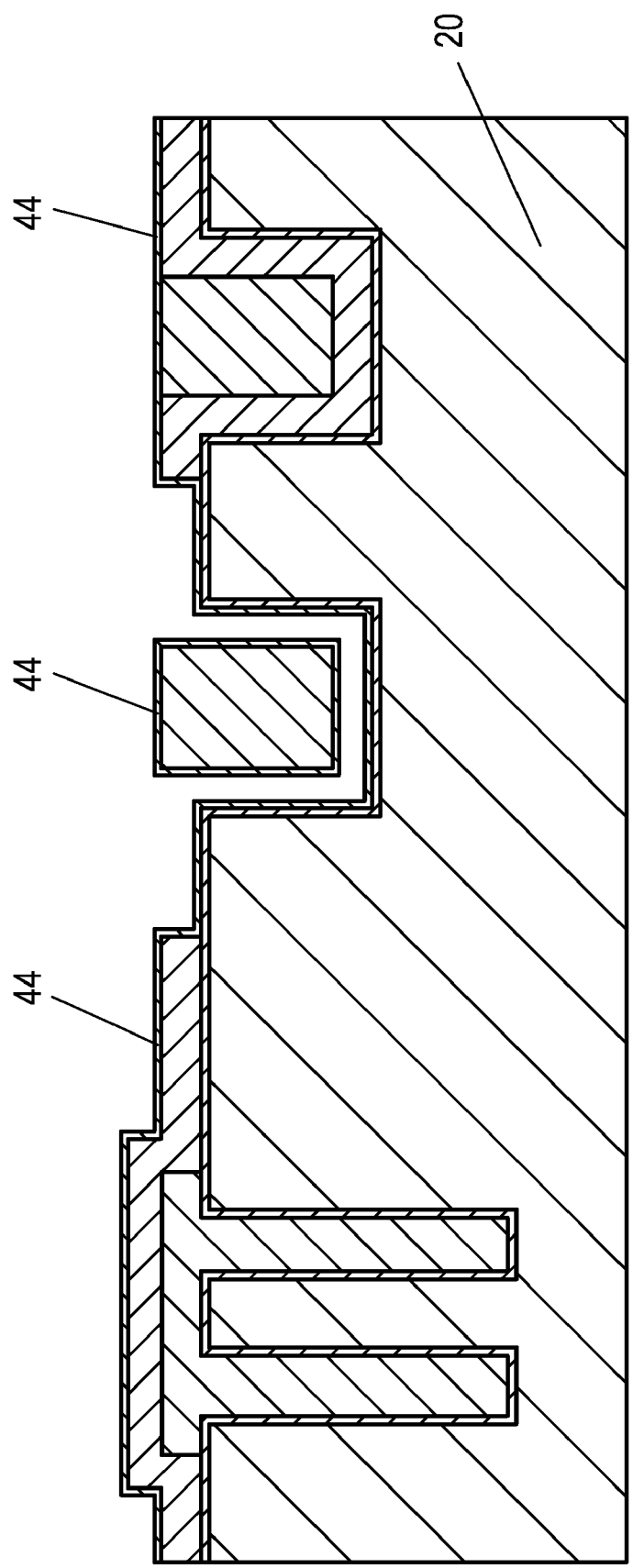

A silicon nitride layer 44 is then deposited over the whole substrate 20 (FIG. 36).

Figure 37:
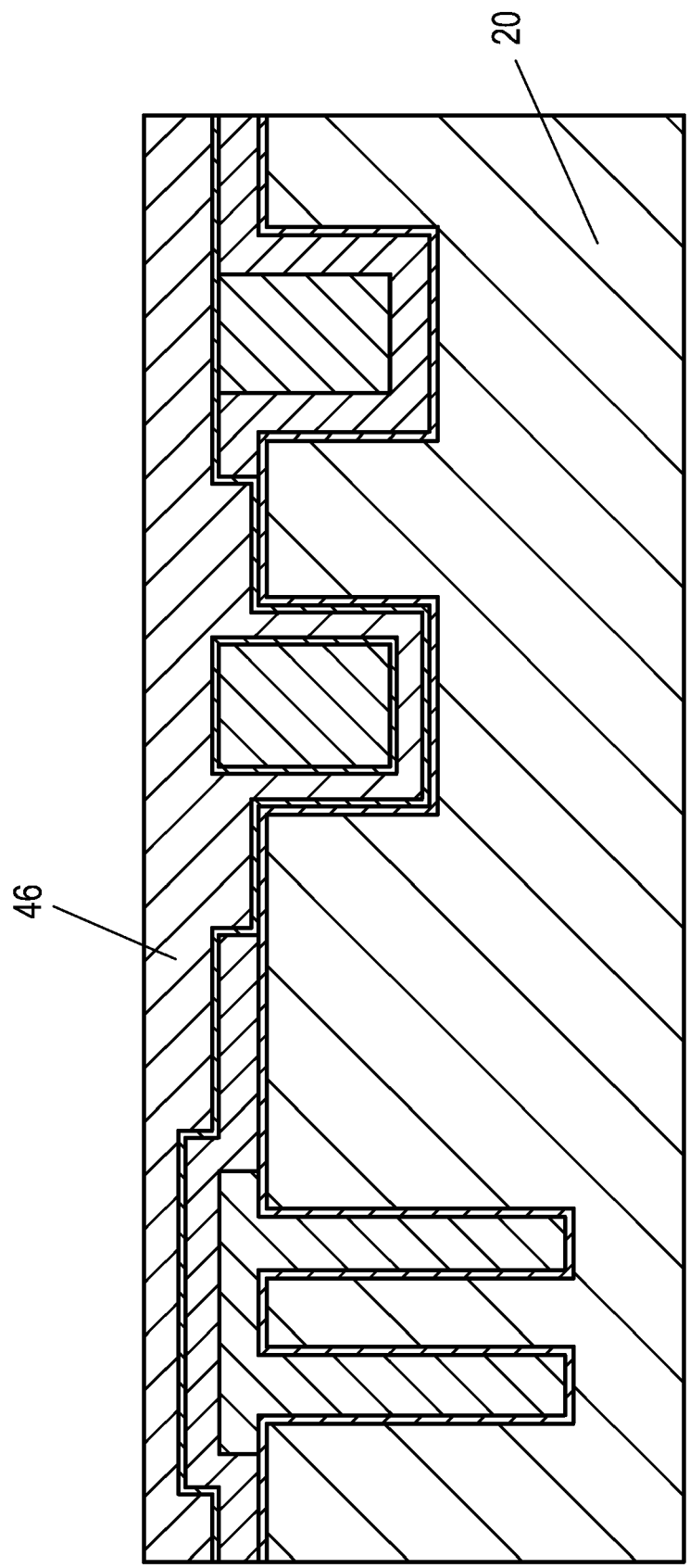
Figure 38:
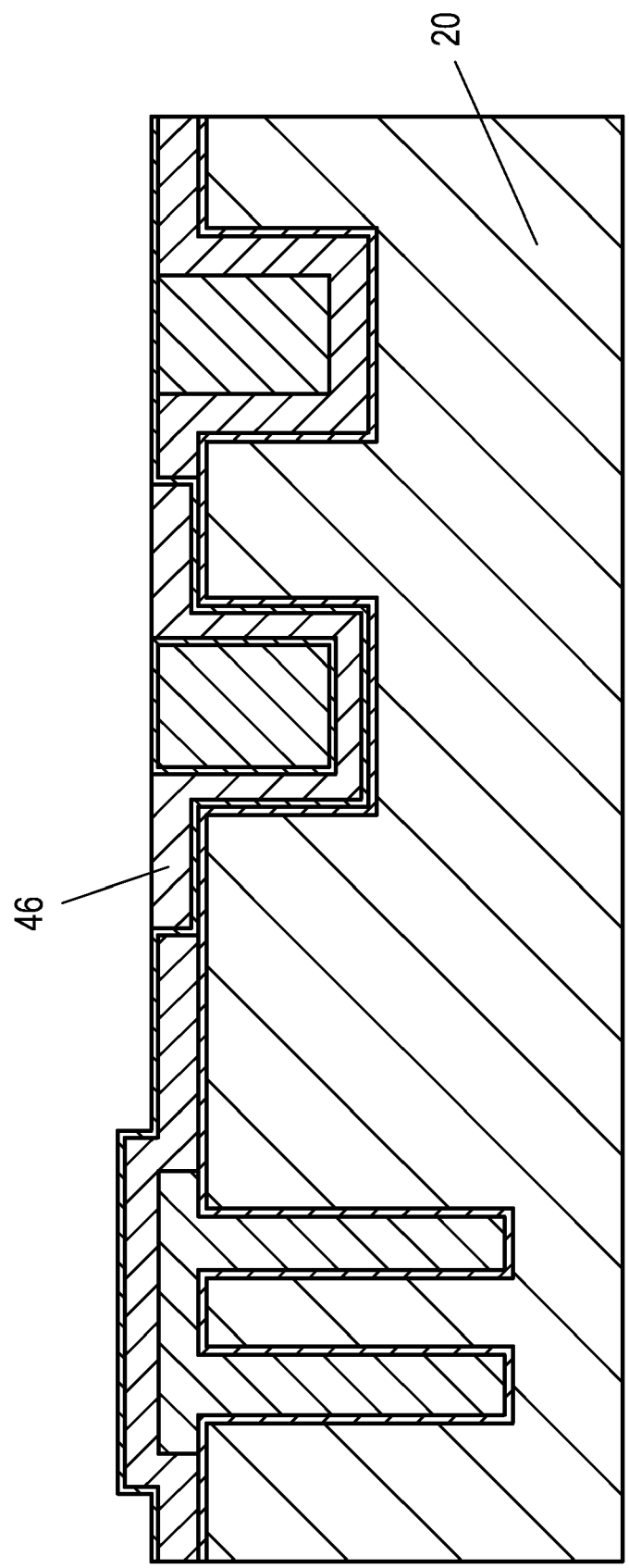

A polymer layer 46 is then applied over the whole substrate (FIG. 37). The polymer layer 46 is the trimmed so that the volume previously occupied by the oxide layer 41 around the polysilicon 38 is removed (FIG. 38).

Figure 39:
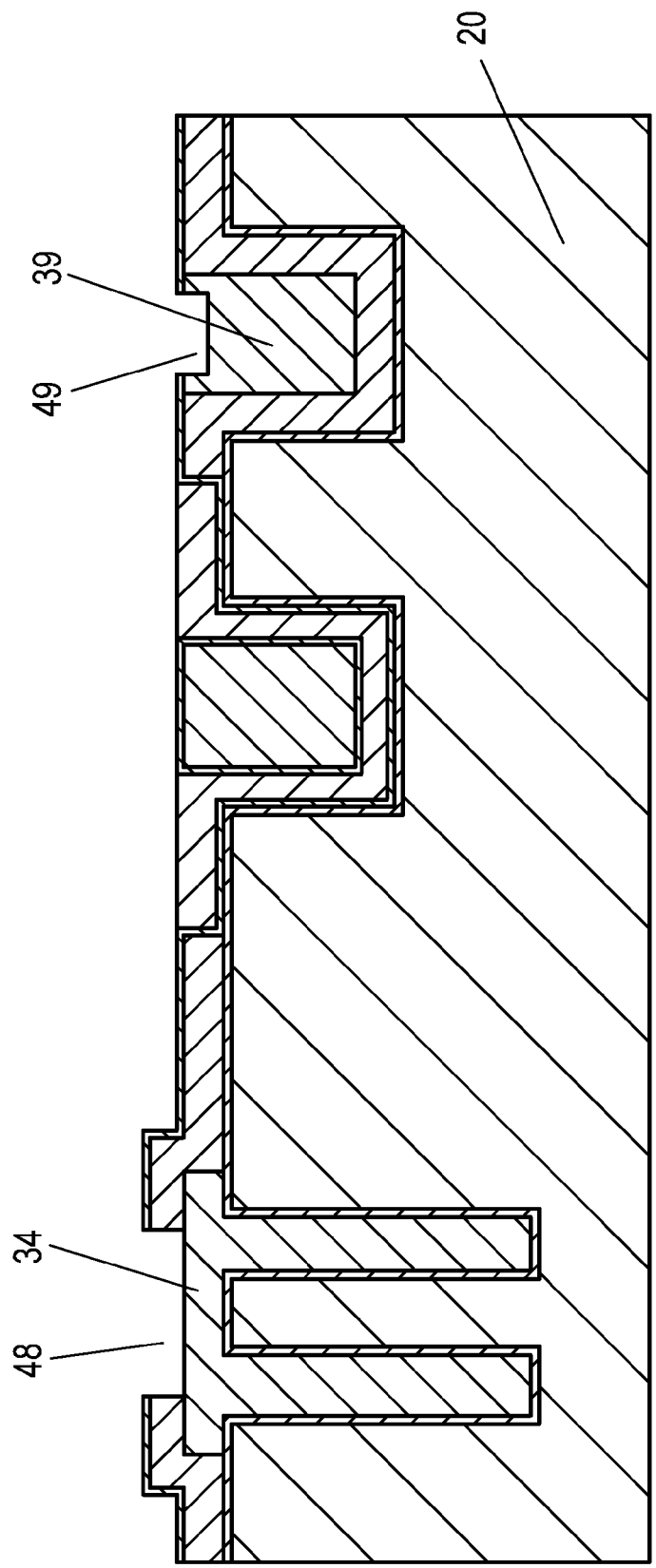

A contact opening 49 is formed in the polysilicon 39 in another of the trenches 29 formed using the first pattern 23. Also a contact opening 48 is formed in the polysilicon layer 34 on top of the trenches 26', 27' formed using the second pattern 25 (FIG. 39).

Figure 40:
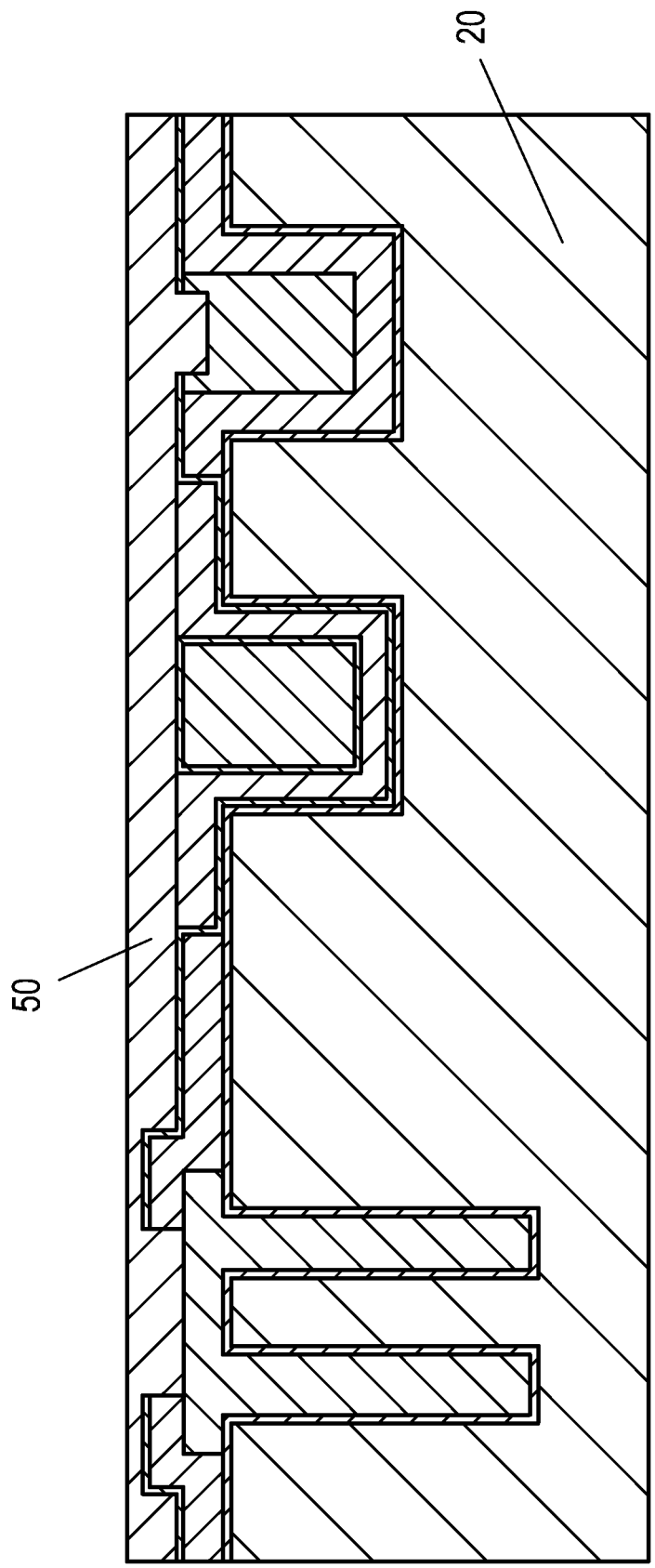

Then a metal layer 50 is applied by conventional metalisation methods, e.g. Cathodic Pulverisation (FIG. 40). Aluminium can be used for the metal layer 50.

Figure 41:
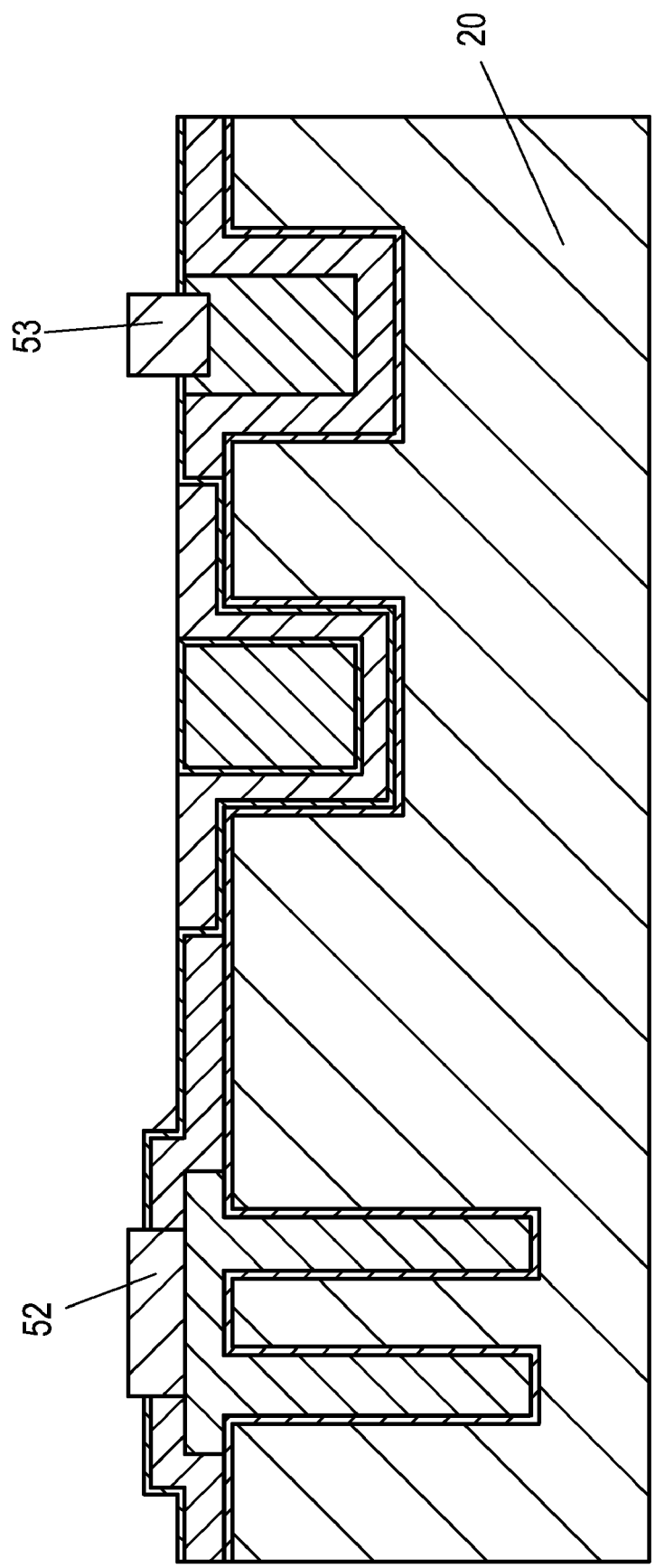
Figure 42:
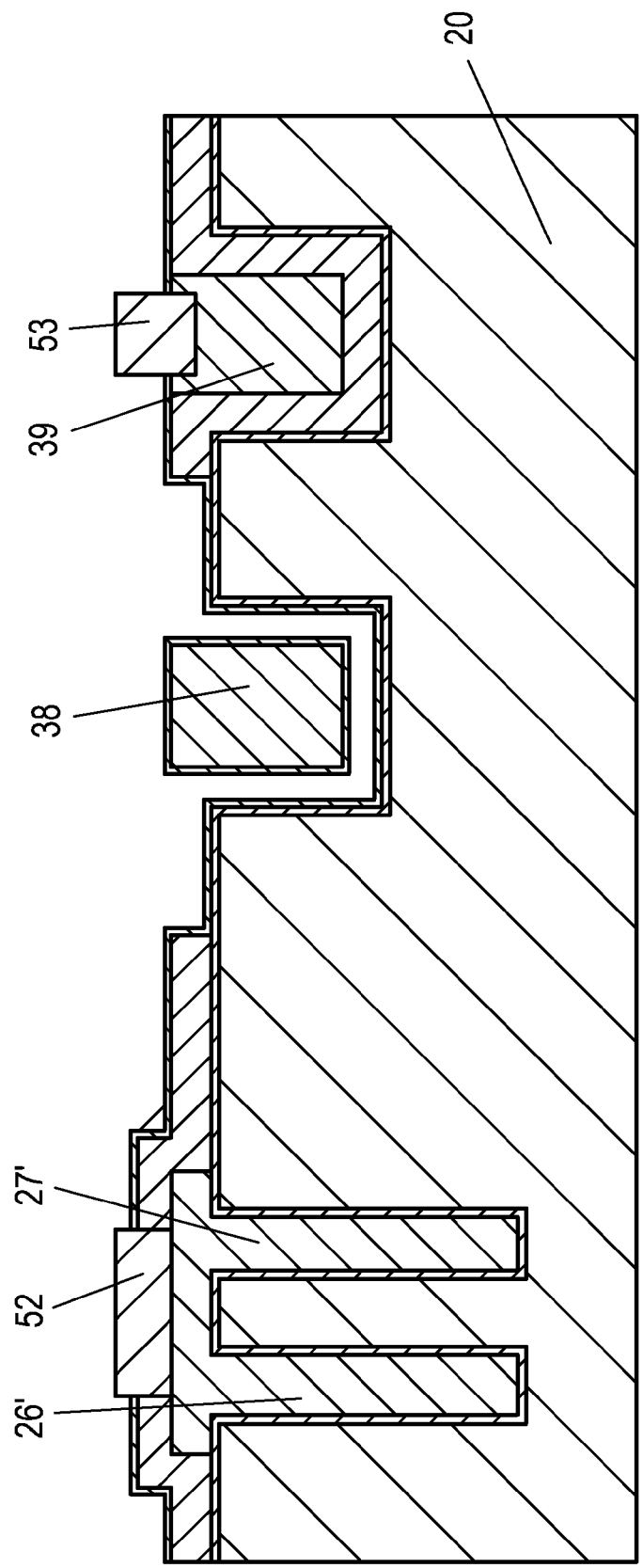

Then the metal layer 50 is patterned using conventional micro lithographic techniques to form contact pads 53, 52, respectively on the polysilicon 39 in the other of the trenches 38, 39 formed using the first pattern 23 and on the polysilicon layer 34 above the trenches 26', 27' formed using the second pattern 25 (FIG. 41). The metal layer 50 is used for contact between the MEMS device and the rest of the circuitry, and the circuitry can be built at same time as the MEMS device. The remaining polymer 46 is then evaporated or released in another way, e.g. by a solvent to release the conductive structure 38 (FIG. 42).

Concluding Remarks:

Some of the embodiments provide miniaturization by replacing two or more sensing elements with a concept that combines the gyroscopic sensing advantage with a high-end multi-axial accelerometer, using the same sensing elements for rotational and linear sensing. A notable consequence of the arrangement of sensing elements is the capability of integrating the sensing elements of the device along with the interface and the processor to provide a solution which can be easier to manufacture and/or smaller, and so more cost effective. Embodiments of the proposed design can be made to suit the requirements of the industry with the currently available technology for production of MEMS devices satisfying every parameter related to the design. The output signals from the interface and its processor can be developed to interpret the information passed on by the sensing elements such as the MEMS elements, to suit the application.

As described above, embodiments may be used in applications that meet a low end gyroscopic sensing effect in addition to the linear sensing perpendicular to the plane. Notable features may include the device having four sensing elements in the form of isolated comb-drives. These can use capacitive sensing to sense displacements. For sensing rotational displacements about axes in the same plane as the substrate, a differential capacitive sensing feature has been described. The proof-mass may be integrated with the electrodes of the comb drive. A reference capacitor can be provided for sensing along the Z axis and Curved (gyroscopic) with respect to fixed capacitor Other variations and examples can be envisaged within the scope of the claims.

The invention claimed is:

1. A multiaxial inertial sensor of angular and linear acceleration, the sensor comprising:
    four sensing elements integrated on a planar substrate, each of the sensing elements comprising:
        a comb drive in which a capacitance varies based on an applied force, wherein each comb drive comprises comb fingers which are laterally movable and movable deeper into or out of respective slots, the four sensing elements being located at different parts of the planar substrate on both sides of an X axis and a Y axis in the plane of the planar substrate and having the comb fingers oriented in different directions in the plane at a right angle to a direction of comb fingers of either adjacent comb drive, and insulating static fingers disposed between the comb fingers in each comb drive.

2. The multiaxial inertial sensor of claim 1, wherein each sensing element comprises separate masses.

3. The multiaxial inertial sensor of claim 2, wherein the separate masses are distributed over a movable part of each sensing element.

4. The multiaxial inertial sensor of claim 1, wherein the four sensing elements are arranged at quadrants of a square.

5. The multiaxial inertial sensor of claim 4, wherein each sensing element comprises a comb shaped movable electrode, surrounded by a correspondingly shaped fixed electrode.

6. The multiaxial inertial sensor of claim 5, wherein the comb shaped movable electrodes of each of the four sensing elements are orientated to face four different directions at right angles to each other.

7. The multiaxial inertial sensor of claim 1, wherein the multiaxial inertial sensor is a Capacitive Multi-Axial Gyroscopic-Accelerometer (CMAGA).

8. The multiaxial inertial sensor of claim 1, wherein the multiaxial inertial sensor senses displacement perpendicular to an axis of rotation.

9. The multiaxial inertial sensor of claim 1, further comprising:
    an anchorage point on the planar substrate, wherein the comb fingers are anchored to the anchorage point.

10. The multiaxial inertial sensor of claim 1, further comprising:
    a reference capacitor.

11. The multiaxial inertial sensor of claim 10, wherein the reference capacitor is used when sensing displacement along a Z axis.

12. The multiaxial inertial sensor of claim 1, further comprising:
    a fifth comb drive.

13. The multiaxial inertial sensor of claim 12, wherein the fifth comb drive is implemented using a top layer.

14. The multiaxial inertial sensor of claim 13, wherein the fifth comb drive is used to sense displacement in a Z direction.

* * * * *